US010873135B2

(12) United States Patent
Kuznetsov et al.

(10) Patent No.: US 10,873,135 B2
(45) Date of Patent: Dec. 22, 2020

(54) ANTENNA, ASSEMBLY, AND METHODS OF FORMING THE SAME

(71) Applicant: Agency for Science, Technology and Research, Singapore (SG)

(72) Inventors: Arseniy Kuznetsov, Singapore (SG); Yuan Hsing Fu, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 84 days.

(21) Appl. No.: 16/329,949

(22) PCT Filed: Sep. 5, 2017

(86) PCT No.: PCT/SG2017/050438
§ 371 (c)(1),
(2) Date: Mar. 1, 2019

(87) PCT Pub. No.: WO2018/048348
PCT Pub. Date: Mar. 16, 2018

(65) Prior Publication Data
US 2019/0214736 A1    Jul. 11, 2019

(30) Foreign Application Priority Data
Sep. 8, 2016   (SG) .......................... 10201607496V

(51) Int. Cl.
*H01Q 15/14*     (2006.01)
*B82Y 20/00*     (2011.01)
(Continued)

(52) U.S. Cl.
CPC ............ *H01Q 15/141* (2013.01); *B82Y 20/00* (2013.01); *G02B 1/002* (2013.01); *H01Q 9/0485* (2013.01);
(Continued)

(58) Field of Classification Search
CPC .. H01Q 15/141; H01Q 21/062; H01Q 9/0485; H01Q 21/061; H01Q 15/14; G02B 1/002; B82Y 20/00; B82Y 30/00
See application file for complete search history.

(56) References Cited

U.S. PATENT DOCUMENTS 10,713,450 B2 * 7/2020 Hunziker ........... G06K 7/10316
2008/0117114 A1 * 5/2008 Haziza .................. H01Q 13/00
343/786

(Continued)

FOREIGN PATENT DOCUMENTS

WO        2015156737 A1    10/2015

OTHER PUBLICATIONS

Staude et al.,"Tailoring Directional Scattering through Magnetic and Electric Resonances in Subwavelength Silicon Nanodisks," ACS Nano, vol. 7, No. 9, Aug. 16, 2013, pp. 7824-7832.
(Continued)

*Primary Examiner* — Renan Luque
(74) *Attorney, Agent, or Firm* — Winstead PC

(57) ABSTRACT

Various embodiments may relate to an antenna. The antenna may include a ridge reflector arranged along a plane. The ridge reflector may be configured to enhance an emission of at least one electromagnetic wave source providing an electromagnetic wave signal to the antenna and further configured to direct the electromagnetic wave signal in a direction at least substantially perpendicular to the plane. The ridge reflector may define a space along the plane for allowing the electromagnetic wave signal to be directed in the direction at least substantially perpendicular to the plane. The ridge reflector may include at least one of a dielectric material and a semiconductor material.

16 Claims, 31 Drawing Sheets

(51) Int. Cl.
*H01Q 9/04* (2006.01)
*G02B 1/00* (2006.01)
*H01Q 21/06* (2006.01)
*B82Y 30/00* (2011.01)

(52) U.S. Cl.
CPC .......... *H01Q 21/062* (2013.01); *B82Y 30/00* (2013.01); *H01Q 15/14* (2013.01); *H01Q 21/061* (2013.01)

(56) References Cited

U.S. PATENT DOCUMENTS

| | | | | |
|---|---|---|---|---|
| 2014/0085693 | A1* | 3/2014 | Mosallaei | G02F 1/19 359/107 |
| 2015/0301275 | A1* | 10/2015 | Andle | H01Q 5/314 385/43 |
| 2016/0334758 | A1* | 11/2016 | Shaltout | H01Q 15/10 |
| 2018/0164430 | A1* | 6/2018 | Kuriyama | H01Q 1/48 |

OTHER PUBLICATIONS

Sikdar et al., "Optically Resonant Magneto-Electric Cubic Nanoantennas for Ultra-Directional Light Scattering," Journal of Applied Physics, vol. 117, No. 083101, Feb. 24, 2015, pp. 1-14.
Shibanuma et al., "Undirectional Light Scattering with High Efficiency at Optical Frequencies Based on Low-Loss Dielectric Nanoantennans," Nanoscale, vol. 8, Jun. 29, 2016, pp. 14184-14192.
Ahmed et al., "Directivity Enhanced Raman Spectroscopy Using Nanoantennas," Nano Letters, vol. 11, 2011, pp. 1800-1803.
Wang et al., "Directional Raman Scattering from Single Molecules in the Feed Gaps of Optical Antennas," Nano Letters, vol. 13, 2013, pp. 2194-2198.
Cao et al., "Directive Emission of Red Conjugated Polymer Embedded Within Zero Index Metamaterials," Optics Express, vol. 22, No. 19, 2014, pp. 22699-22706.
Aouani et al., "Plasmonic Antennas for Directional Sorting of Fluorescence Emission," Nano Letters, vol. 11, 2011, pp. 2400-2406.
Aouani et al., "Bright Unidirectional Fluorescence Emission of Molecules in a Nanoaperture with Plasmonic Corrugations," Nano Letters, vol. 11, 2011, pp. 637-644.
Meng et al., "Highly Directional Spaser Array for the Red Wavelength Region," Laser Photonics Rev. 8, No. 6, 2014, pp. 896-903.
Lozano et al., "Tailor-Made Directional emission in Nanoimprinted Plasmonic-Based Light-Emitting Devices," Nanoscale, vol. 6, 2014, pp. 9223-9229.
Ding et al., "Spectral and Directional Reshaping of Fluorescence in Large Area Self-Assembled Plasmonic—Photonic Crystals," Nano Letters, vol. 13, 2013, pp. 378-386.
Yang et al., "Unidirectional Lasing from Template-Stripped Two-Dimensional Plasmonic Crystals," ACS Nano, vol. 9, No. 12, 2015, pp. 11582-11588.
Bechger et al., "Directional Fluorescence Spectra of Laser Dye in Opal and Inverse Opal Photonic Crystals," J. Phys. Chem. B, vol. 109, 2005, pp. 9980-9988.
Kim et al., "Vertical Beaming of Wavelength-Scale Photonic Crystal Resonators," Phys. Rev. B 73, 235117, 2006, pp. 1-13.
Portalupi et al., "Planar Photonic Crystal Cavities with Far-Field Optimization for High Coupling Efficiency and Quality Factor," Optics Express, vol. 18, No. 15, 2010, pp. 16064-16073.
Narimatsu et al., "Enhancement of Vertical Emission in Photonic Crystal Nanolasers," Applied Physics Letters, vol. 100, 121117, 2012, pp. 1-3.
Wu et al., "Control of Two-Dimensional Excitonic Light Emission via Photonic Crystal," 2D Materials, vol. 1, 011001, 2014, pp. 1-21.
Staude et al., "Shaping Photoluminescence Spectra with Magnetoelectric Resonances in All-Dielectric Nanoparticles," ACS Photonics, vol. 2, 2015, pp. 172-177.
Caldarola et al., "Non-Plasmonic Nanoantennas for Surface Enhanced Spectroscopies with Ultra-Low Heat Conversion," Nature Communications, vol. 6, 7915, 2015, pp. 1-8.
Song et al., "Highly Directional Fluorescent Emission at Visible Wavelengths with a Silicon Metasurface," CLEO, 2016, pp. 1-2.
Levene et al., "Zero-Mode Waveguides for Single-Molecule Analysis at High Concentrations," Science, vol. 299, 2003, pp. 682-686.
Witten Opinion of the International Searching Authority for International Application No. PCT/SG2017/050438 dated Dec. 13, 2017, pp. 1-5.
International Preliminary Report on Patentability for International Application No. PCT/SG2017/050438 dated Sep. 10, 2018, pp. 1-19.

* cited by examiner

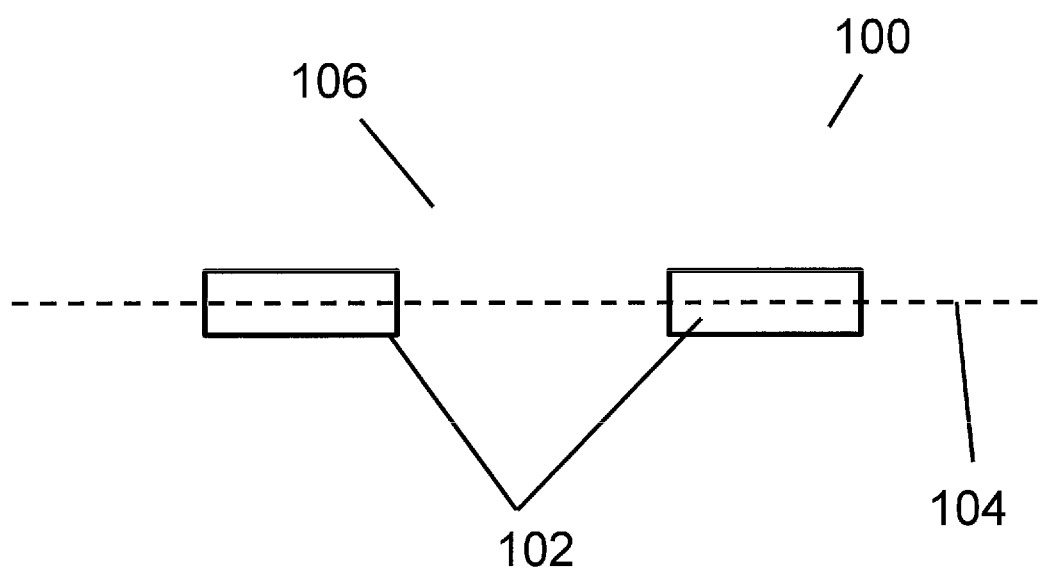

ANTENNA, ASSEMBLY, AND METHODS OF FORMING THE SAME

CROSS-REFERENCE TO RELATED APPLICATION

This application claims the benefit of priority of Singapore application No. 10201607496V filed Sep. 8, 2016, the contents of it being hereby incorporated by reference in its entirety for all purposes.

TECHNICAL FIELD

Various aspects of this disclosure relate to an antenna. Various embodiments may relate to an assembly. Various embodiments may relate to methods of forming an antenna and/or assembly.

BACKGROUND

Optical nano-antennas based on resonant plasmonic elements have been extensively studied for enhancement of luminescence of localized light sources (such as fluorophores, dyes, quantum dots etc.) in the visible and IR spectral ranges. Optical nano-antennas, similar to microwave antennas, may efficiently convert propagating radiation to localized energy, and vice versa, but operate in the optical frequency ranges. Owing to the resonant nature of plasmonic elements, plasmonic antennas may create high near-field enhancement localized around the antenna and enhance far-field luminescence of localized light sources. The main disadvantage of current plasmonic nanoantennas and plasmonic-based devices in general, is high losses of plasmons in the optical spectral range. Due to these losses, most of the energy tends to dissipate through heating of the antennas, rather than being emitted into the far-field.

Recently, a new concept of optical nanoantennas based on resonant dielectric nanostructures has been proposed and theoretically investigated. Similar to plasmonic elements, high-refractive index dielectric particles may possess strong resonances at optical frequencies. However, in contrast to plasmonics, these resonances are associated only with displacement (polarization) currents with no real currents and thus no ohmic losses involved. Thus, this resonant behaviour in transparent dielectric materials can be practically lossfree. It has been shown theoretically that high-refractive index dielectric antennas can provide near-field enhancement and fluorescence enhancement of electric-dipole emitters comparable to plasmonic antennas. They can also significantly outperform plasmonic antennas when an electric dipole emitter is located relatively far from the antenna surface (>50 nm) or when a magnetic dipole emitter is used to excite the antenna. The performances of dielectric antenna designs for directivity and field enhancement have been verified experimentally in the gigahertz (GHz) spectral range, while silicon nano-antennas have been simulated at visible and near-infrared (IR) frequencies using suitable material parameters. The enhancement of luminescence and surface enhanced Raman scattering have also been demonstrated with no heat generation into surrounding medium.

Dielectric nano-antennas have been designed either to enhance the total luminescence of point dipole sources without controlling luminescence directivity or to enhance directivity in directions parallel to the nano-antenna plane (e.g. plane of the substrate at which the antenna can be fabricated). For example, a Yagi-Uda type dielectric antenna can provide significant luminescence enhancement in the direction parallel to its axis (in the antenna plain). On the other hand, in many practical applications (such as bioimaging systems) it is important to enhance the fluorescence signal detected from top or from bottom of the nano-antenna surface.

SUMMARY

Various embodiments may relate to an antenna. The antenna may include a ridge reflector arranged along a plane. The ridge reflector may be configured to enhance an emission of at least one electromagnetic wave source providing an electromagnetic wave signal to the antenna and further configured to direct the electromagnetic wave signal in a direction at least substantially perpendicular to the plane. The ridge reflector may define a space along the plane for allowing the electromagnetic wave signal to be directed in the direction at least substantially perpendicular to the plane. The ridge reflector may include at least one of a dielectric material and a semiconductor material.

Various embodiments may relate to a method of forming an antenna. The method may include arranging a ridge reflector along a plane. The ridge reflector may be configured to enhance an emission of at least one electromagnetic wave source providing an electromagnetic wave signal to the antenna and further configured to direct the electromagnetic wave signal in a direction at least substantially perpendicular to the plane. The ridge reflector may define a space along the plane for allowing the electromagnetic wave signal to be directed in the direction at least substantially perpendicular to the plane. The ridge reflector may include at least one of a dielectric material and a semiconductor material.

Various embodiments may relate to an assembly including the antenna, and the at least one electromagnetic wave source.

Various embodiments may relate to a method of forming an assembly. The method may include providing an antenna, and providing the at least one electromagnetic wave source.

BRIEF DESCRIPTION OF THE DRAWINGS

The invention will be better understood with reference to the detailed description when considered in conjunction with the non-limiting examples and the accompanying drawings, in which:

FIG. 1 shows a side view of an antenna according to various embodiments.

FIG. 2 shows a schematic illustrating a method of forming an antenna according to various embodiments.

DETAILED DESCRIPTION

Figure 3:
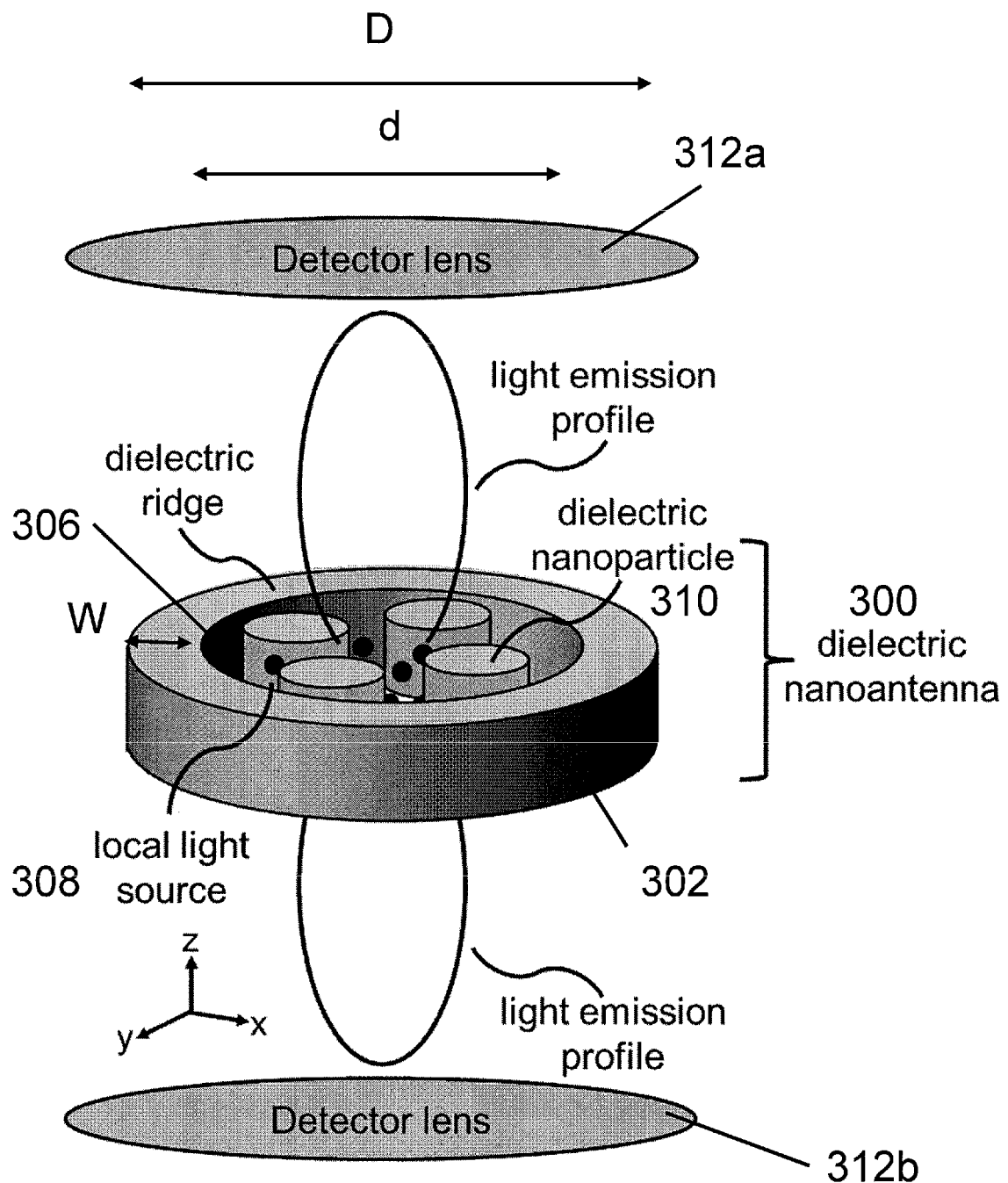
FIG. 3 shows an assembly according to various embodiments. The assembly may include an antenna and one or more electromagnetic wave sources.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of one of the methods or antenna/assembly are analogously valid for the other methods or antennas/assemblies. Similarly, embodiments described in the context of a method are analogously valid for an antenna/assembly, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may also be used herein to mean that the deposited material may be formed "indirectly on" the implied side or surface with one or more additional layers being arranged between the implied side or surface and the deposited material. In other words, a first layer "over" a second layer may refer to the first layer directly on the second layer, or that the first layer and the second layer are separated by one or more intervening layers.

The antenna or assembly as described herein may be operable in various orientations, and thus it should be understood that the terms "top", "bottom", etc., when used in the following description are used for convenience and to aid understanding of relative positions or directions, and not intended to limit the orientation of the antenna or assembly.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Based on reasons highlighted in the Background section, nano-antenna designs capable of significant fluorescence enhancement and boosting the fluorescence directivity perpendicular to the nano-antenna plane are required. So far enhancement of fluorescence emission directivity perpendicular to the nano-antenna plane has only been investigated with plasmonic or low-index diffraction-based dielectric antennas. High-index dielectric based nano-antennas have also recently been studied but are also based on diffraction principle.

A few designs based on the high-refractive index (n equal to or more than 2) dielectric or semiconductor nanoparticles of different sizes to enhance the fluorescence signal in the direction perpendicular the device plane have been proposed by the inventors.

Various embodiments described herein relate to antennas based on resonant high-refractive index (n equal to or more than 2) dielectric or semiconductor ridges, and may additionally include nanoparticles providing strong luminescence enhancement of localized light sources (such as fluorophores, dye molecules, quantum dots etc.) surrounding the antenna in the direction perpendicular to the antenna or nano-antenna plane. Various embodiments may include high-refractive index dielectric or semiconductor ridges as reflectors with higher efficiency.

FIG. 1 shows a side view of a antenna 100 according to various embodiments. The antenna 100 may include a ridge reflector 102 arranged along a plane (which may be referred to as an antenna plane or nano-antenna plane) 104. The ridge reflector 102 may be configured to enhance an emission of at least one electromagnetic wave source providing an electromagnetic wave signal to the antenna 100 and further configured to direct the electromagnetic wave signal in a direction at least substantially perpendicular to the plane 104. The ridge reflector 102 may define a space 106 along the plane 104 for allowing the electromagnetic wave signal to be directed in the direction at least substantially perpendicular to the plane 104. The ridge reflector 102 may include at least one of a dielectric material and a semiconductor material.

In other words, the antenna 100 may include a ridge reflector 102 surrounding a space 106 on a plane 104. The ridge reflector 102 may enhance the emission from one or more electromagnetic wave sources and may also direct the emission emitted from the one or more electromagnetic wave sources in a direction substantially perpendicular to the plane 104, i.e. out of the plane 104. The ridge reflector 102 may include a dielectric material and/or a semiconductor material.

The term "enhance" may mean an increment or an improvement. In various embodiments, an enhancement factor may be calculated as total (integrated) electromagnetic wave signal emitted by a electromagnetic wave source in the presence of an antenna, divided by the integrated electromagnetic wave signal emitted by the electromagnetic wave source without the antenna.

The antenna 100 may be an optical antenna. In various embodiments, each dimension of the antenna may be less than 2 μm. For instance, the nano-antenna may have a diameter or width of any suitable value equal to or less than 2 μm, and a height or thickness equal to or less than 2 μm. In various embodiments, the antenna may be a nano-antenna. In the current context, a nano-antenna may be an antenna in which each dimension is substantially equal to 1000 nm or less. For instance, the nano-antenna may have a diameter or width of any suitable value equal to or less than 1000 nm, and a height or thickness equal to or less than 1000 nm.

In various embodiments, the electromagnetic wave signal may include at least one selected from a group consisting of a visible light, an infrared light, a terahertz radiation, and a microwave radiation. In various embodiments, the electromagnetic wave signal may include a wavelength selected from a range of 400 nm to 1 m, e.g. 400 nm to 10 μm, e.g. 500 nm to 800 nm or 1 μm to 10 μm. In various embodiments, the electromagnetic wave signal may be an optical signal. In various embodiments, an emission may relate to an optical emission. In various embodiments, an electromagnetic source may be a light source.

A refractive index of the ridge reflector 102 may be equal to or greater than 2, i.e. ≥2. The refractive index may be determined based on the wavelength of interest, e.g. a wavelength selected from a range of 400 nm to 1 μm or a range of 500 nm to 800 nm.

In various embodiments, the ridge reflector 102 may include a semiconductor material, such as but is not limited to silicon (Si), silicon nitride (SiN), germanium (Ge), other Group IV semiconductors, a III-V semiconductor (e.g. gallium phosphide (GaP), gallium nitride (GaN), gallium arsenide (GaAs), indium phosphide (InP), or similar), different alloys, and any combination of materials with refractive index equal to or greater than 2. In various other embodiments, the ridge reflector 102 may include a dielectric material, such as but is not limited to titanium oxide ($TiO_2$), zinc oxide (ZnO). These exemplary materials may be generally named as dielectrics although they are wide bandgap semiconductors.

In various embodiments, the ridge reflector 102 may be a single structure.

In various embodiments, the ridge reflector 102 may be a continuous structure surrounding the space 106. The ridge reflector 102 may form a ring around the space 106. In the current context, a "ring" may be but is not limited to a circular shaped ring, but may also for instance, a square shaped or polygonal shaped ring (e.g. a hexagonal shaped ring).

In various other embodiments, the ridge reflector 102 may include or may be made up of a plurality of ridges surrounding the space. The plurality of ridges may be spaced apart from one another. In other words, the ridge reflector 102 may include a plurality of discrete ridges, with each ridge of the plurality of ridges spaced apart from neighboring ridges. In various embodiments, the plurality of ridges may form a concentric arrangement around the space 106. The arrangement may be, but is not limited to a circular shape, a square shape, or a polygonal shape.

The ridge reflector 102 may have any one suitable shape selected from a group consisting of circle, a square, and a polygon. However, the ridge reflector 102 may alternatively be of any other suitable shape.

The ridge reflector 102 may be of any suitable thickness, and may be of any suitable diameter. The ridge reflector 102 may have a width selected from a range of, for instance, 80 nm or greater, 160 nm or greater, 200 nm or greater, or 300 nm or greater. The ridge reflector 104 may have an inner diameter selected from a range of, for instance, 1 μm or less, 500 nm or less, 120 nm or less, or 50 nm or less.

In various embodiments, the ridge reflector 102 may be an open structure or may be a closed structure. A "closed structure" as described herein may refer to a structure that completely surrounds the space 106 along the plane 104, while an "open structure" as described herein may refer to a structure that does not completely surround the space 106 along the plane 104.

In various embodiments, the ridge reflector 102 may include a plurality of structures, cells, or units. For instance, each structure, cell, or unit may include a continuous ridge surrounding a space. Portions of one ridge may also form a portion of neighboring ridges. The plurality of structures, cells, or units may be arranged in a regular or ordered manner, e.g. in a honeycomb shape.

The ridge reflector 102 may serve to reduce or prevent electromagnetic wave signals from being transmitted laterally along the (antenna) plane 102 and/or parallel to the (antenna) plane 102.

In various embodiments, the antenna 100 may be further configured to direct a further electromagnetic wave signal in a further direction opposite the direction, wherein the further direction may also be at least substantially perpendicular to the plane. In other words, the antenna 100 may be a bi-directional antenna, and may be configured to direct electromagnetic wave signals in opposing directions, which are perpendicular to the antenna plane 104.

In the context of various embodiments, the phrases "a direction . . . substantially perpendicular to the plane" and "further direction . . . at least substantially perpendicular to the plane" may refer to directions that are exactly 90° to the plane and/or directions at angles that are slightly greater or less than 90° to the plane. The electromagnetic wave signals may occupy a space in the form of a cylinder or an inverted cone in an upward direction and/or a downward direction from (or relative to) the plane 104.

In various embodiments, the antenna 100 may further include one or more nanostructures, such as nanoparticles. In the current context, a nanostructure is a structure with each dimension (e.g. diameter and height) substantially equal to a value in the range of 200 nm or less. The one or more nanostructures may be arranged or provided in the space 106.

Each nanostructure may have electric type and magnetic type Mie resonances in the range of antenna operation. The nanostructures may be introduced to obtain a high luminescence enhancement.

Each of the one or more nanostructures may have a refractive index equal to or greater than 2. In various embodiments, the one or more nanostructures may include a semiconductor material, such as but is not limited to silicon (Si), silicon nitride (SiN), germanium (Ge), other Group IV semiconductors, a III-V semiconductor (e.g. gallium phosphide (GaP), gallium nitride (GaN), gallium arsenide (GaAs), indium phosphide (InP) or similar), different alloys, and any combination of materials with refractive index equal to or greater than 2. In various other embodiments, the one or more nanostructures may include a dielectric material, such as but is not limited to titanium oxide ($TiO_2$), zinc oxide (ZnO).

In the context of various embodiments, the phrase "one or more nanostructures" may refer to a single nanostructure, i.e. the one or more nanostructures may consist of a single nanostructure. In the context of various other embodiments, the phrase "one or more nanostructures" may refer to a plurality of nanostructures. In other words, one or more nanostructures may consist of one nanostructure, or may include a plurality of nanostructures.

In various embodiments, individual nanostructures of the plurality of nanostructures may be made of the same material.

In various embodiments, individual nanostructures of the plurality of nanostructures may be made of different materials. For instance, a first nanostructure of the plurality of nanostructures may include a first material such as silicon, while a second nanostructure of the plurality of nanostructures may include a second material such as zinc oxide.

In the various embodiments, the plurality of nanostructures may be of the same size/diameter. In various other embodiments, the plurality of nanostructures may be of different sizes or may be of different diameters. For instance, a diameter of a first nanostructure of the plurality of nanostructures may be greater than a diameter of a second nanostructure of the plurality of nano structures.

In various embodiments, the plurality of nanostructures may be of the same shape. In various other embodiments, the plurality of nanostructures may be of different shapes. A nanostructure may, for instance, be cylindrical, cuboidal, prismatic, or spherical, or may be of any other suitable shape.

In various embodiments, the one or more nanostructures may be a plurality of nanostructures arranged in an ordered manner, e.g. in an ordered array or lattice, or may be arranged in a disordered arrangement. In the current context, an ordered array or lattice may mean that the array or lattice has a fixed period, i.e. the distance between neighbouring nanostructures may be substantially the same.

Various embodiments may provide an assembly including the antenna 100 as described herein and the at least one electromagnetic wave source. The at least one electromagnetic wave source may include fluorophores, quantum dots, dyes etc.

The assembly may include a substrate in contact with the antenna 100. In various embodiments, the antenna 100 may be on the substrate. The substrate may be made of or may include a material, such as glass, substantially transparent at the excitation and/or emission wavelengths. The substrate may support the antenna. The assembly may further include a metal film such as an aluminum (Al) film. The metal film may be on or over the antenna 100. The metal film may include a through-hole or channel extending from a first side of the film to a second side of the film opposite the first side. The metal film including the through-hole or channel may be a zero-mode waveguide. Light may only propagate for a short distance into the hole, but not through the hole. In various other embodiments, there may not be a metal film on or over the substrate.

The at least one electromagnetic wave source may be arranged or provided in the space 106 defined by the ridge reflector 102.

The assembly may also include a medium covering or in contact with the antenna 100. The medium may have a refractive index equal to or less than 2.

FIG. 2 shows a schematic 200 illustrating a method of forming an antenna according to various embodiments. The method may include, in 202, arranging a ridge reflector along a plane. The ridge reflector may be configured to enhance an emission of at least one electromagnetic wave source providing an electromagnetic wave signal to the antenna and further configured to direct the electromagnetic wave signal in a direction at least substantially perpendicular to the plane. The ridge reflector may define a space along the plane for allowing the electromagnetic wave signal to be directed in the direction at least substantially perpendicular to the plane. The ridge reflector may include at least one of a dielectric material and a semiconductor material.

In various embodiments, the method may also include providing one or more nanostructures in the space.

Various embodiments may provide a method of forming an assembly. The method may include providing an antenna as described herein. The method may also include providing the at least one electromagnetic wave source.

Various embodiments may relate to designs of antennas, e.g. nano-antennas, based on resonant high-refractive index (n≥2) dielectric or semiconductor ridges and nanoparticles. Various embodiments may provide enhancement of luminescence of localized electromagnetic wave sources, e.g. light sources, adjacent to the antennas (fluorophores, dyes, quantum dots, etc.) in the direction perpendicular to the antenna plane, which may be the plane of the substrate where antenna structure is located and/or the plane at which the antenna structure is fabricated.

The localized electromagnetic wave sources may be surrounded by the ridge reflector, which may help to enhance the emission of the localized electromagnetic wave sources and may direct the light emitted by the electromagnetic wave sources in a direction perpendicular to the antenna plane (e.g. potentially towards a detector). The shape of the ridge reflectors may be square, rectangle, circle, polygon, or of any other closed shape.

The width and thickness of the ridge reflector may be designed to tailor the enhancement in the spectral range of interest. In some embodiments the localized electromagnetic wave sources may also be adjacent to nanostructures or nanoparticles arranged in an array, e.g. a square or hexagonal lattice or in any other ordered or disordered manner.

The shapes of the nanostructures may be cylindrical, cuboidal, prismatic, spherical, or of any other suitable shape. The antenna may include a plurality of units arranged in a square or hexagonal lattice, or in any other ordered or disordered manner. The spectral range of the optimized antenna performance may be in the visible, infra-red, terahertz and/or gigahertz range. It may be possible to tune the antenna by changing the size of the nanostructure and/or the size of the ridge reflector.

FIG. 3 shows an assembly according to various embodiments. The assembly may include an nano-antenna 300 and one or more electromagnetic wave sources 308. The nano-antenna 300 may be a nano-antenna based on a high-refractive index ridge reflector 302 for out-of-plane luminescence enhancement. The localized electromagnetic wave sources 308 may be located inside the closed ridge 302 (which in this example has a circular ring shape) and may be near or adjacent to the nanoparticles 310 comprised in the nano-antenna 300.

In particular designs of ridge reflectors 302 and nanoparticles 310, the nano-antenna 300 may both enhance the total luminescence of the localized electromagnetic wave sources and tailor the emission directivity towards directions perpendicular to the nano-antenna plane. The nano-antenna plane may be defined as the plane at which the nano-antenna structure lies along and is fabricated, i.e. parallel to x-y plane in FIG. 3.

As highlighted above, the ridge reflector 302 may be in the shape of a circular ring. The ring may have an inner circumference defining the space 306. The inner diameter (denoted as "d") of the ring may define the inner circumference (i.e. πd), and may run across the space 306. The ring may also have an outer diameter (denoted as "D") and may define an outer circumference (i.e. πD). The inner circumference and the outer circumference may define a width (denoted as "W") of the ring. As mentioned above, the ring may alternatively be of any other suitable shape.

FIGS. 4A-G show a top planar view of different nano-antennas according to various embodiments.

Figure 4A:
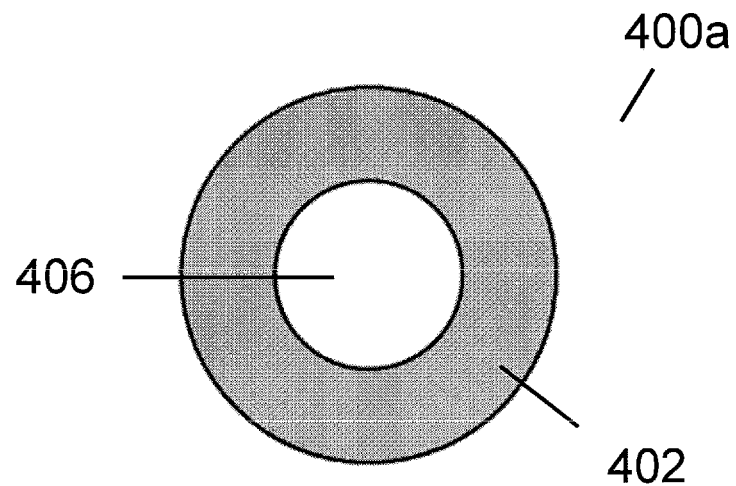
FIG. 4A shows a top planar view of an nano-antenna including a ridge reflector according to various embodiments.

FIG. 4A shows a top planar view of an nano-antenna 400a including a ridge reflector 402 according to various embodiments. The ridge reflector 402 may have a circular ring shape. The inner circumference of the ridge reflector 402 may define a space 406. The nano-antenna 400a may be devoid of nanostructures or nanoparticles.

Figure 4B:
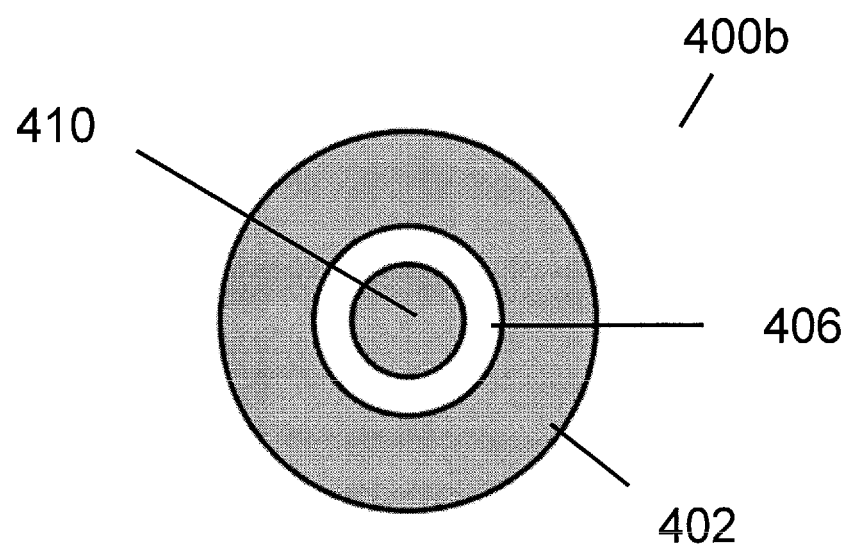
FIG. 4B shows a top planar view of another nano-antenna including a ridge reflector according to various embodiments.

FIG. 4B shows a top planar view of another nano-antenna 400b including a ridge reflector 402 according to various embodiments. The nano-antenna 400b may be similar to the nano-antenna 400a shown in FIG. 4A, but further include a cylindrical nanoparticle 410 in the space 406.

Figure 4C:
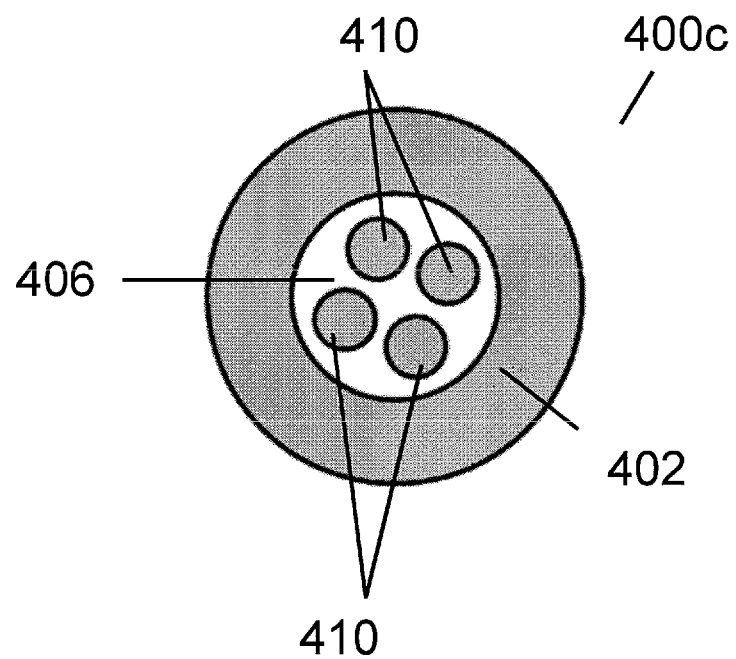
FIG. 4C shows a top planar view of another nano-antenna including a ridge reflector according to various embodiments.

FIG. 4C shows a top planar view of another nano-antenna 400c including a ridge reflector 402 according to various embodiments. The nano-antenna 400c may be similar to the nano-antenna 400a shown in FIG. 4A, but may further include a regular, ordered array of multiple nanoparticles or a disordered arrangement of multiple nanoparticles 410, e.g. two or more or e.g. four or more, nanoparticles 410, in the space 406.

Figure 4D:
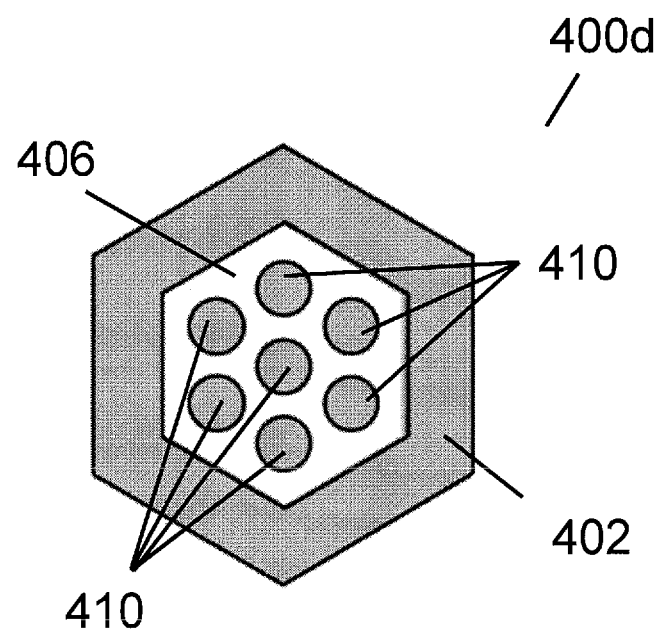
FIG. 4D shows a top planar view of another nano-antenna including a ridge reflector according to various embodiments.

FIG. 4D shows a top planar view of another nano-antenna 400d including a ridge reflector 402 according to various embodiments. The ridge reflector 402 in FIG. 4D may have a shape different from that shown in FIGS. 4A-C. The ridge reflector 402 in FIG. 4D may have a hexagonal ring shape. The nano-antenna 400d may include a regular, ordered hexagonal array or a disordered arrangement of multiple nanoparticles 410, e.g. two or more, or seven or more cylindrical nanoparticles 410 in the space 406.

Figure 4E:
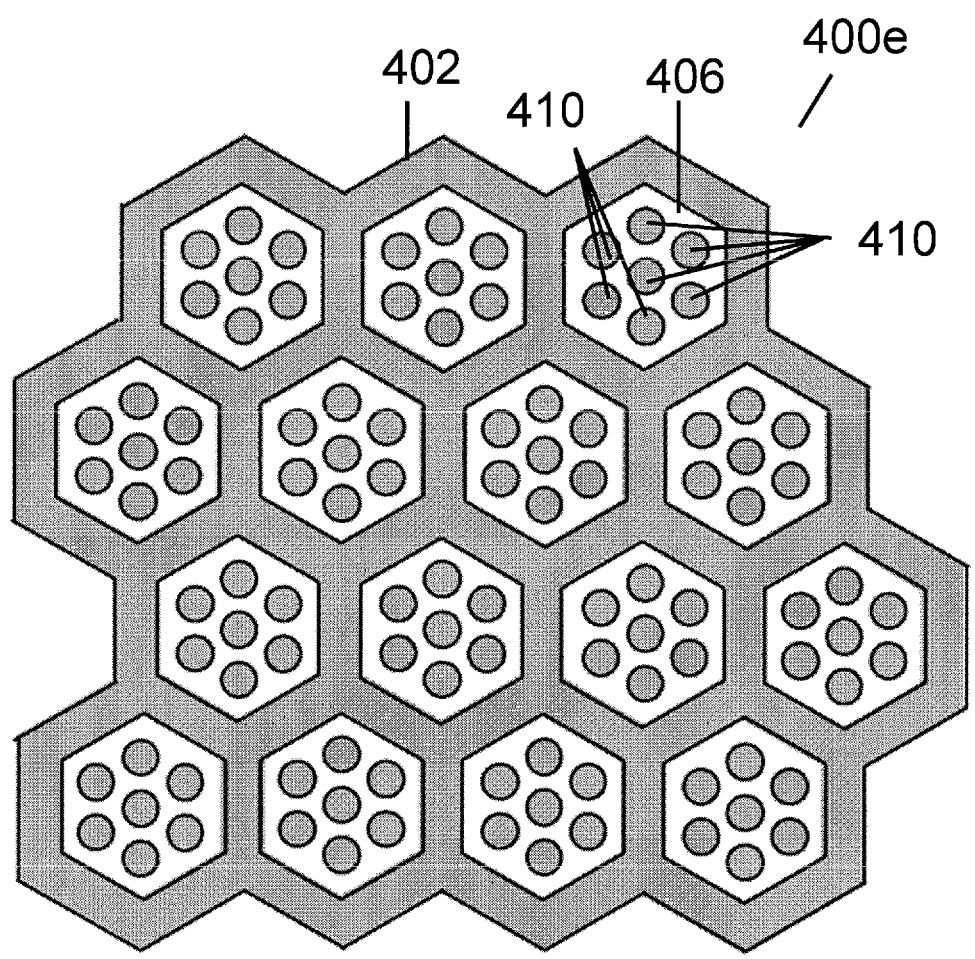
FIG. 4E shows a top planar view of another nano-antenna including a ridge reflector according to various embodiments.

FIG. 4E shows a top planar view of another nano-antenna 400e including a ridge reflector 402 according to various embodiments. The ridge reflector 402 may be a honeycomb shaped structure including a plurality of cells. Each cell of the plurality of cells may define a space 406, and may also include a plurality of nanoparticles 410, e.g. two or more, or seven or more nanoparticles 410, arranged in a regular, ordered array or in an disordered arrangement. In order to avoid clutter, only one cell in FIG. 4E has been labelled.

Figure 4F:
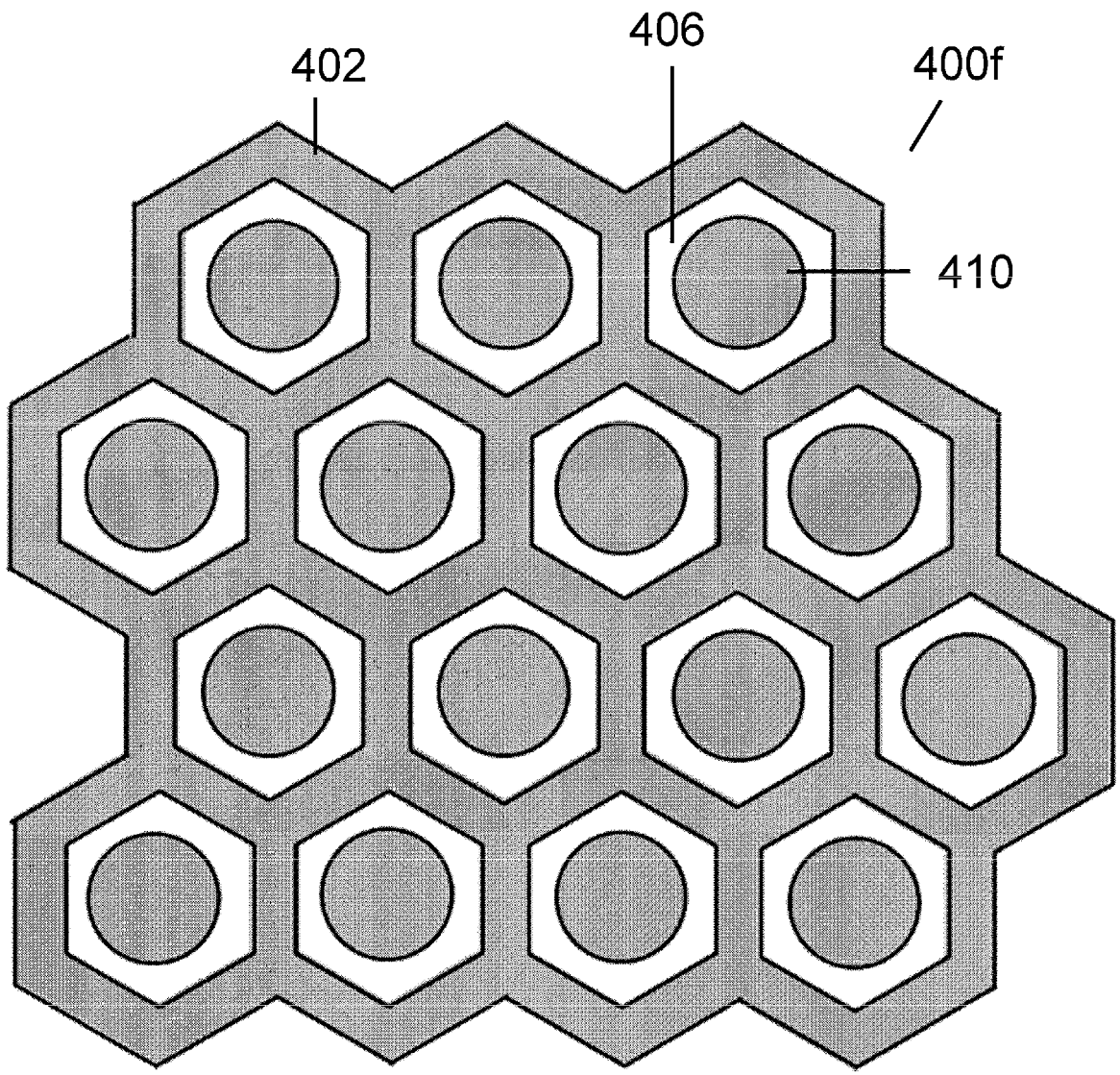
FIG. 4F shows a top planar view of yet another nano-antenna including a ridge reflector according to various embodiments.

FIG. 4F shows a top planar view of yet another nano-antenna 400f including a ridge reflector 402 according to various embodiments. The nano-antenna 400f may be similar to the nano-antenna 400e shown in FIG. 4E, but may include or consist of only a single nanoparticle 410 in the space 406 of each cell. In order to avoid clutter, only one cell in FIG. 4F has been labelled.

Figure 4G:
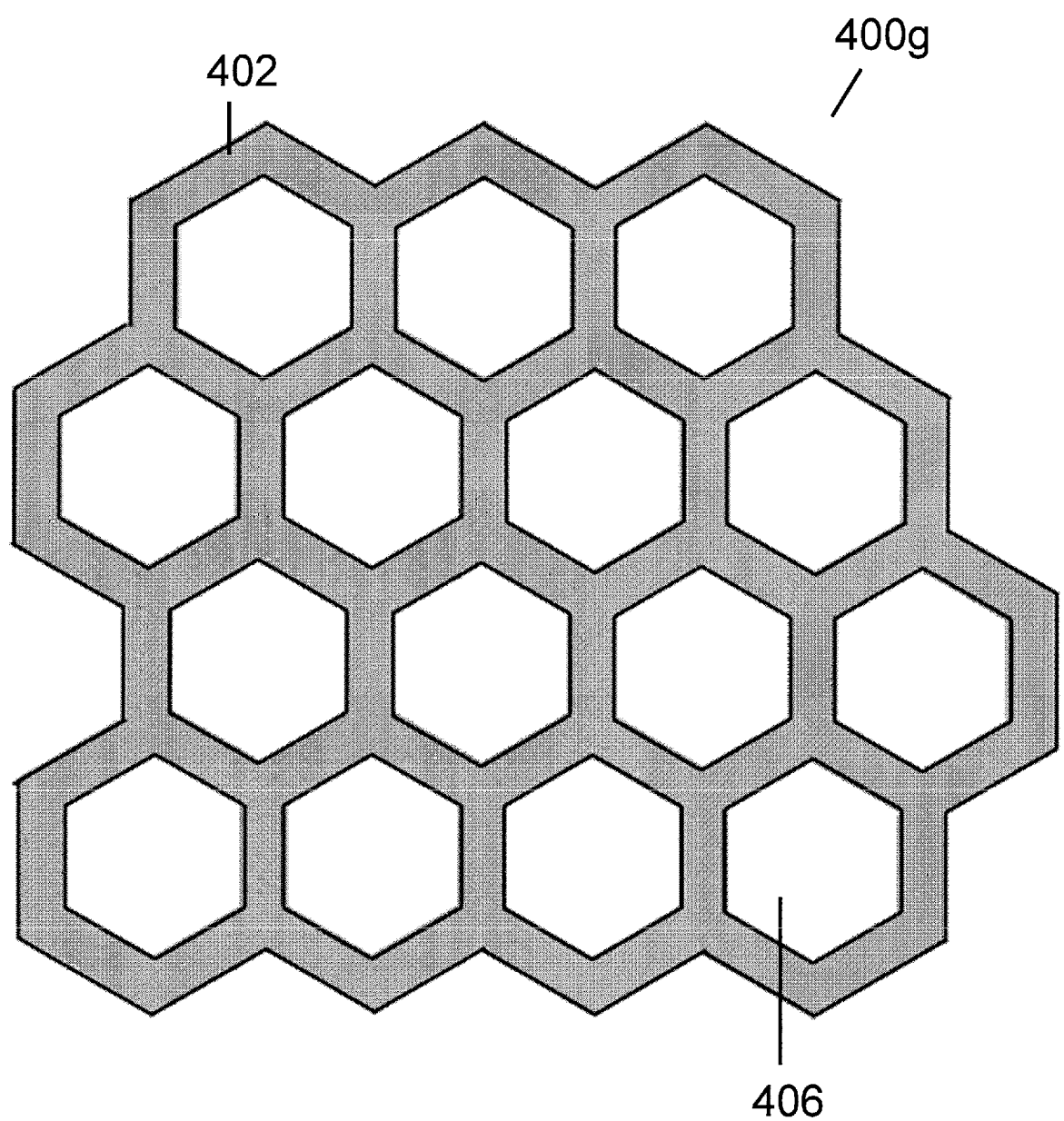
FIG. 4G shows a top planar view of yet another nano-antenna including a ridge reflector according to various embodiments.

FIG. 4G shows a top planar view of yet another nano-antenna 400g including a ridge reflector 402 according to various embodiments. The nano-antenna 400g may be similar to the nano-antenna 400e shown in FIG. 4E, but may not include any nanostructure or nanoparticle in the spaces 406. In order to avoid clutter, only one cell in FIG. 4G has been labelled.

The ridge reflector 402 may include a suitable dielectric material or a suitable semiconductor material with a refractive index equal to or greater than 2. The nanostructure(s) or nanoparticle(s) may include a suitable dielectric material or a suitable semiconductor material with a refractive index equal to or greater than 2. Lower losses in the dielectric material or semiconductor material in the spectral range of interest may lead to a better antenna performance. The nanostructure(s) or nanoparticle(s) may include a material that is the same or include a material that is different from the material of the ridge reflector 402. Each nanostructure or nanoparticle may have a cylindrical shape, cuboidal shape, prismatic shape, spherical shape, or any other suitable shapes. The ridge reflector 402 may be of a circular shape, a polygonal shape, a square shape, or of any other suitable closed or unclosed shape. In various embodiments, the ridge reflector 402 may include a plurality of ridges located at different lateral directions to block in-plane nano-antenna emission. The width and/or thickness of the ridge may be tailored for optimized performance in the spectral range of interest. The nano-antennas (including the ridge reflector 402, and may further include nanostructure(s)) may be stand-alone or may be arranged in a square or hexagonal lattice, or in any other suitable ordered or disordered manner on the sample surface.

In order to demonstrate the performance of some exemplary nano-antenna designs, finite-difference time domain simulations (FDTD, Lumerical Solutions) have been applied. For the simulations, silicon (Si) has been chosen as a material of the ridge reflector and the nanoparticles. Silicon may be a good material of choice for the visible and near-infrared (IR) spectral range of operation, since it has a relatively high refractive index (>3.5) and low losses in the visible and near-IR spectral ranges (e.g. wavelengths from about 500 nm to about 3 μm). The localized electromagnetic wave sources have been modelled as point electric dipoles randomly oriented and distributed around the nanoparticles.

Each dipole may be taken as emitting independently of the other dipoles to generate a far-field emission diagram based on the interaction of the dipole with the antenna. The total emission diagram is calculated as a sum of the emission diagrams of all single dipoles. 50 dipoles are used in the simulations to provide a statistical distribution.

Figure 5A:
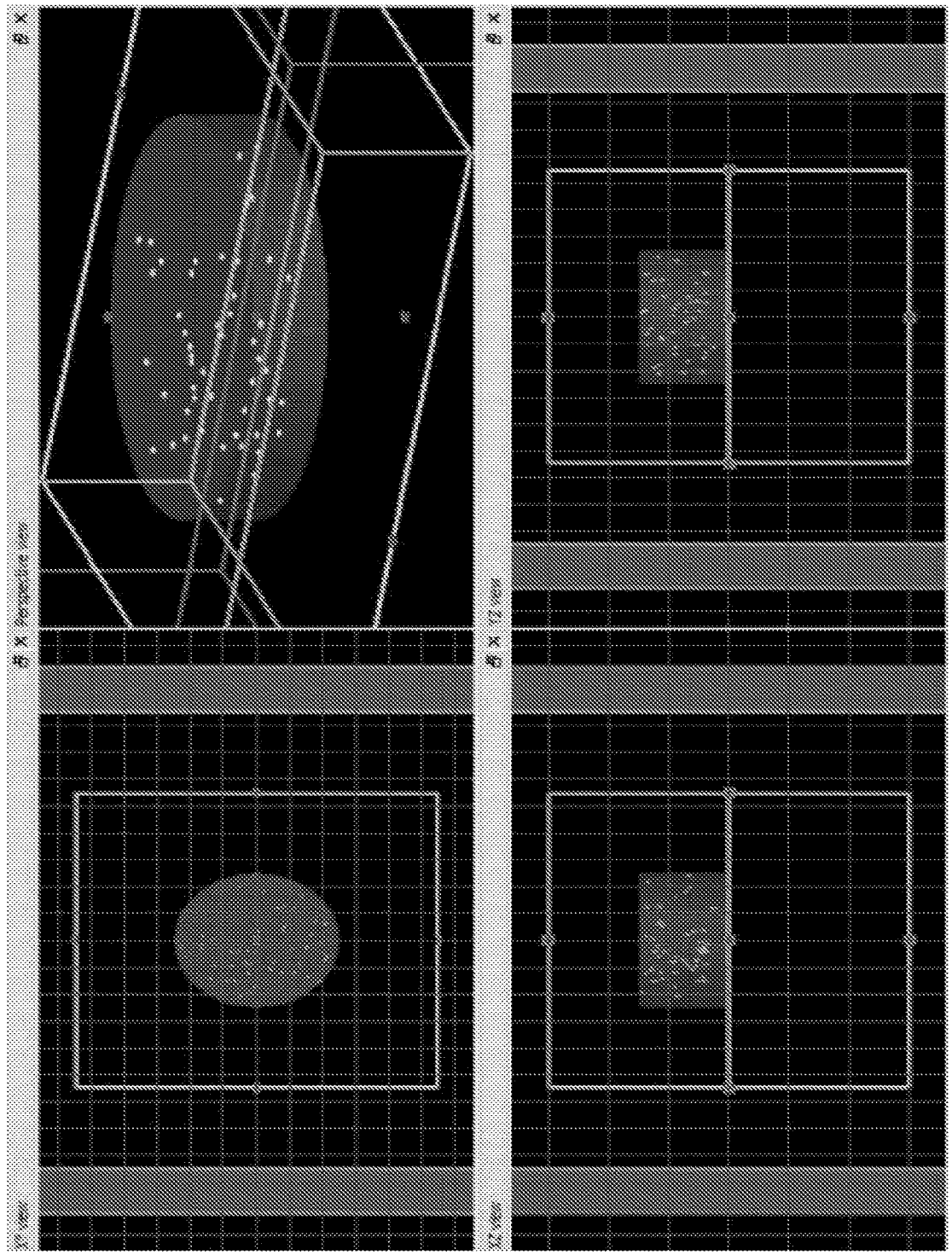
FIG. 5A shows simulated X-Y view (top left), perspective view (top right), X-Z view (bottom left), and Y-Z view (bottom right) of dipoles in homogenous media.
Figure 5B:
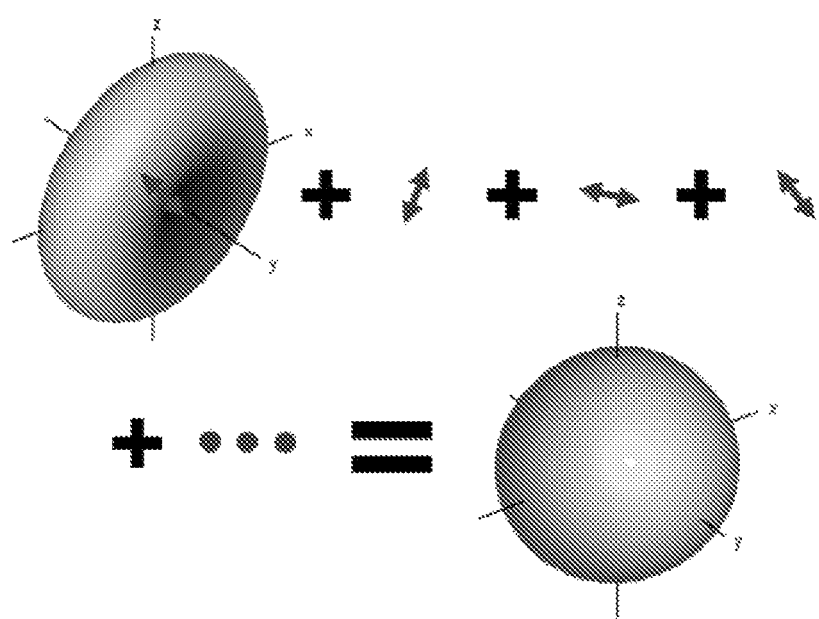
FIG. 5B shows the simulated far-field emission pattern of the dipoles in homogenous media shown in FIG. 5A.

FIG. 5A shows simulated X-Y view (top left), perspective view (top right), X-Z view (bottom left), and Y-Z view (bottom right) of dipoles in homogenous media. FIG. 5B shows the simulated far-field emission pattern of the dipoles in homogenous media shown in FIG. 5A.

Figure 5C:
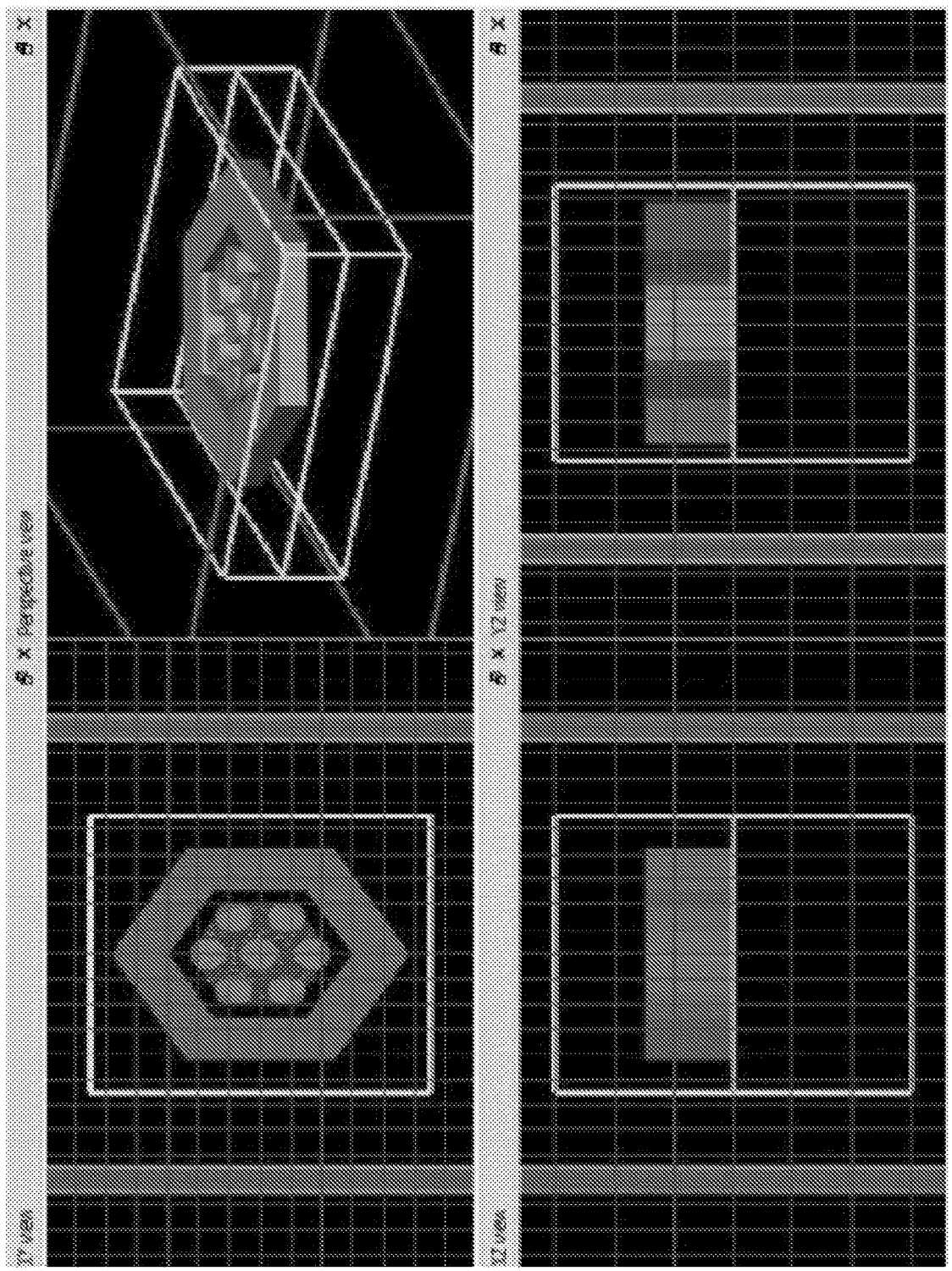
FIG. 5C shows simulated X-Y view (top left), perspective view (top right), X-Z view (bottom left), and Y-Z view (bottom right) of dipoles with antennas according to various embodiments.
Figure 5D:
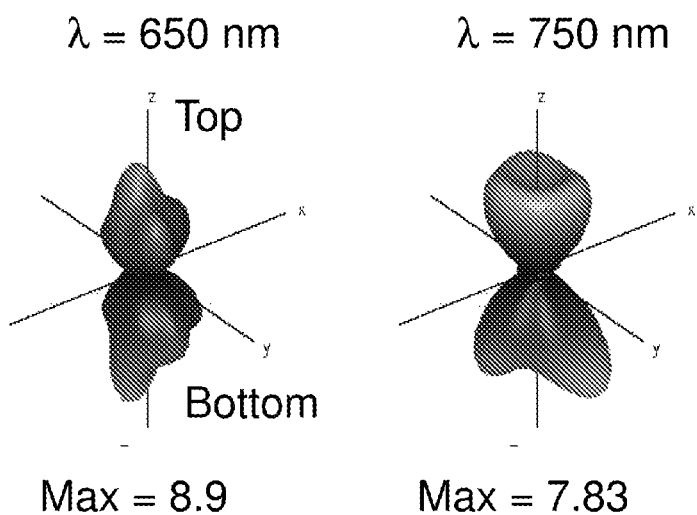
FIG. 5D shows the simulated far-field emission pattern of the dipoles shown in FIG. 5C.

FIG. 5C shows simulated X-Y view (top left), perspective view (top right), X-Z view (bottom left), and Y-Z view (bottom right) of dipoles with antennas according to various embodiments. FIG. 5D shows the simulated far-field emission pattern of the dipoles shown in FIG. 5C.

Figure 5E:
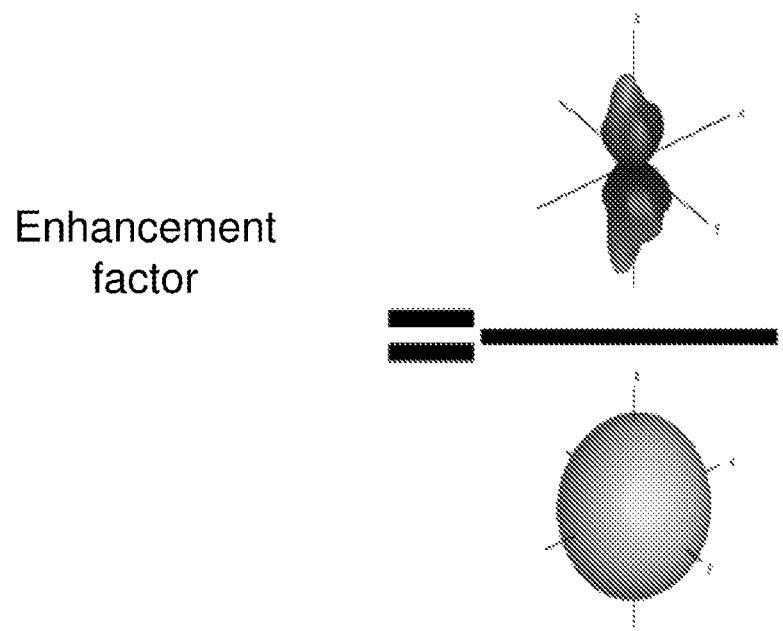
FIG. 5E illustrates the method of determining enhancement factor of an antenna according to various embodiments.

FIG. 5E illustrates the method of determining enhancement factor of an antenna according to various embodiments. The enhancement factor may be calculated as total (integrated) electromagnetic wave signal emitted by a electromagnetic wave source in the presence of an antenna, divided by the integrated electromagnetic wave signal emitted by the electromagnetic wave source without the antenna.

FIGS. 6A-L illustrate different exemplary designs of nano-antennas to illustrate principles of achieving high emission enhancement in direction(s) perpendicular to the antenna plane. The schematics shown in part (i) are schematic representations with black dots showing the position of the localized electromagnetic wave sources in the nano-antennas. The plots in (ii) show emission enhancement factors provided by the nano-antennas based on 50 randomly distributed and oriented dipoles. In other words, the far-field diagrams presented in part (ii) are normalized to the far-field diagram of 50 independently emitting, randomly distributed and oriented dipoles located in the same area but without the nano-antenna. The model may simulate experimental situations when the nano-antennas are surrounded by randomly distributed emitters, which emit in different directions and at different time moments.

The minimal distance between a particle surface and a dipole may be set to be about 10 nm. This minimal distance may account for effects of silicon oxidation or an additional protective layer on top of the antennas. In the simulation, the nano-antenna may be surrounded by a homogeneous medium with refractive index of about 1.4 to simulate a nano-antenna on a low-refractive index substrate (n=1.4–1.6), in which the nano-antenna is also covered by a liquid or solid medium.

The line NA (numerical aperture) 0.38T represents the enhancement factor determined based on electromagnetic wave signals captured by an objective lens with microscope objective of 0.38 NA at the top of the nano-antenna, while the line NA 0.38B represents the enhancement factor determined based on electromagnetic wave signals captured by an objective lens with microscope objective of 0.38 NA at the bottom of the nano-antenna. The solid line represents the total enhancement factor exhibited by the nano-antenna.

Figure 6A:
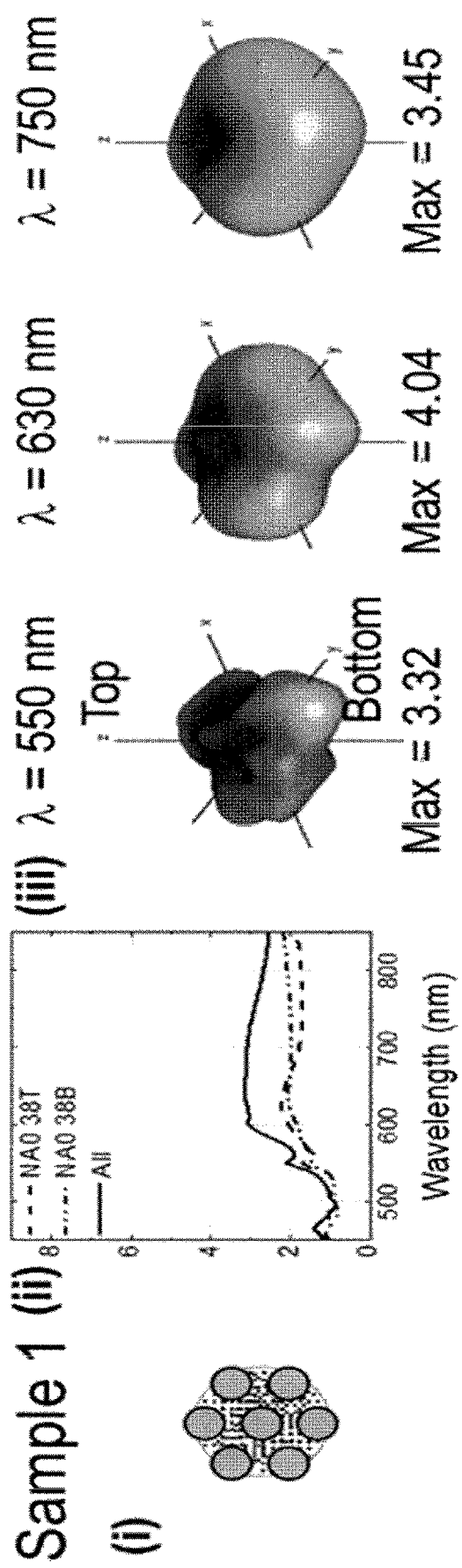
FIG. 6A shows (i) a top planar view of a nano-antenna (Sample 1); (ii) a plot of enhancement factor as a function of wavelengths (in nanometers or nm) of the nano-antenna shown in (i) showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i).

For the emission diagrams in part (iii), the emission of each dipole may be calculated separately and averaged over the 50 dipoles with different random locations and orientations. The notation "λ" in (iii) shows the wavelength at which the emission diagram is calculated. The notation "max" in (iii) shows the maximum emission value of the corresponding emission diagram towards a maximum emission direction. More details on FIGS. 6A-L are as described below:

FIG. 6A shows (i) a top planar view of a nano-antenna (Sample 1); (ii) a plot of enhancement factor as a function of wavelengths (in nanometers or nm) of the nano-antenna shown in (i) showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i).

The nano-antenna shown in FIG. 6A may include 7 nanostructures of the same size in a hexagonal arrangement. Each nanostructure may be a cylinder with a height of 150 nm and a diameter of 120 nm. The side-to-side separation between the neighboring cylinders may be 50 nm. A total enhancement factor of around 3 may be achieved in the presence of the nano-antenna. However, as shown in part (ii), the directional enhancement factor towards the top direction and the bottom direction may be lower than the total enhancement factor (integrated over all directions) through the major part of the visible spectrum, which corresponds to the emission diagram in part (iii) which shows that the emission is mostly directed parallel to the nano-antenna plane.

Figure 6B:
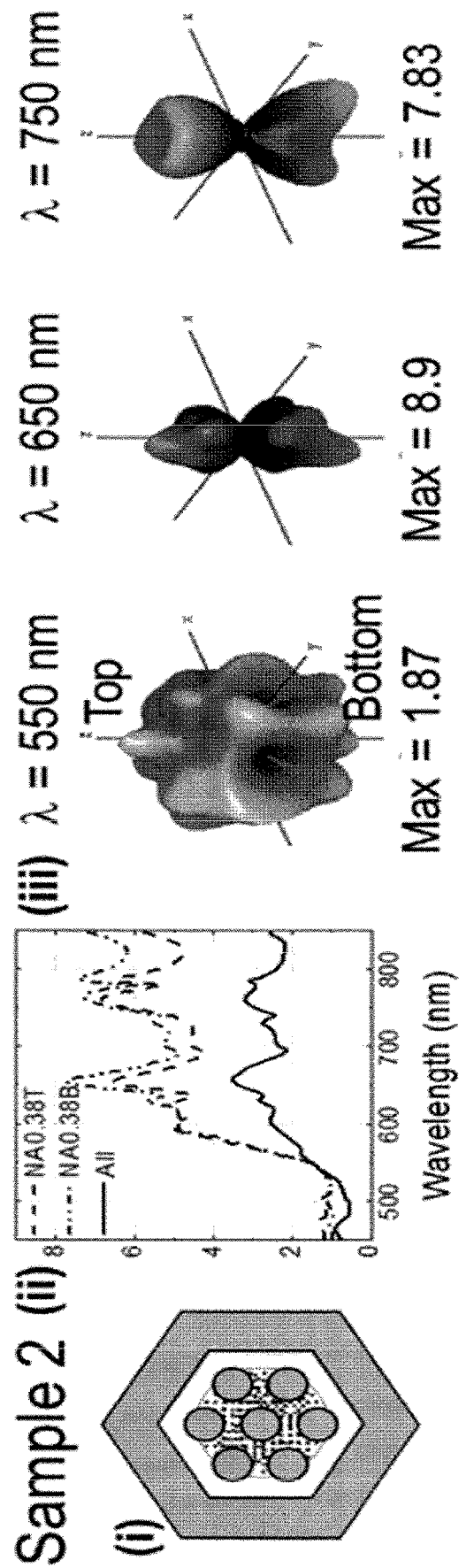
FIG. 6B shows (i) a top planar view of a nano-antenna according to various embodiments (Sample 2); (ii) a plot of enhancement factor as a function of wavelengths (in nanometers or nm) of the nano-antenna shown in (i) according to various embodiments showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i) according to various embodiments.

FIG. 6B shows (i) a top planar view of a nano-antenna according to various embodiments (Sample 2); (ii) a plot of enhancement factor as a function of wavelengths (in nanometers or nm) of the nano-antenna shown in (i) according to various embodiments showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i) according to various embodiments.

Sample 2 has an arrangement of nanostructures that is similar Sample 1, but also includes a ridge with hexagonal ring shape. The ridge has a rectangular cross-section with the width of 160 nm, and a thickness of 150 nm, which is substantially the same as that of the nanostructures. The minimum gap between the particles and the inner surface of the ridge is 50 nm. As shown in part (ii), the total enhancement factor of Sample 2 may be similar to Sample 1 (see solid curve in part (ii)). However, the directional enhancement factors (dashed and dashed-dotted lines) are higher than the total enhancement factor through the whole visible spectrum, which may indicate that the emission directivity is enhanced along the directions perpendicular to the nano-antenna plane. It may also be clearly observed in part (iii) that the far-field emission diagrams show that the emission is enhanced towards the directions perpendicular to the nano-antenna plane. The comparison between Sample 1 and Sample 2 shows how the ridge reflector may influence the directivity of the nano-antenna emission.

Figure 6C:
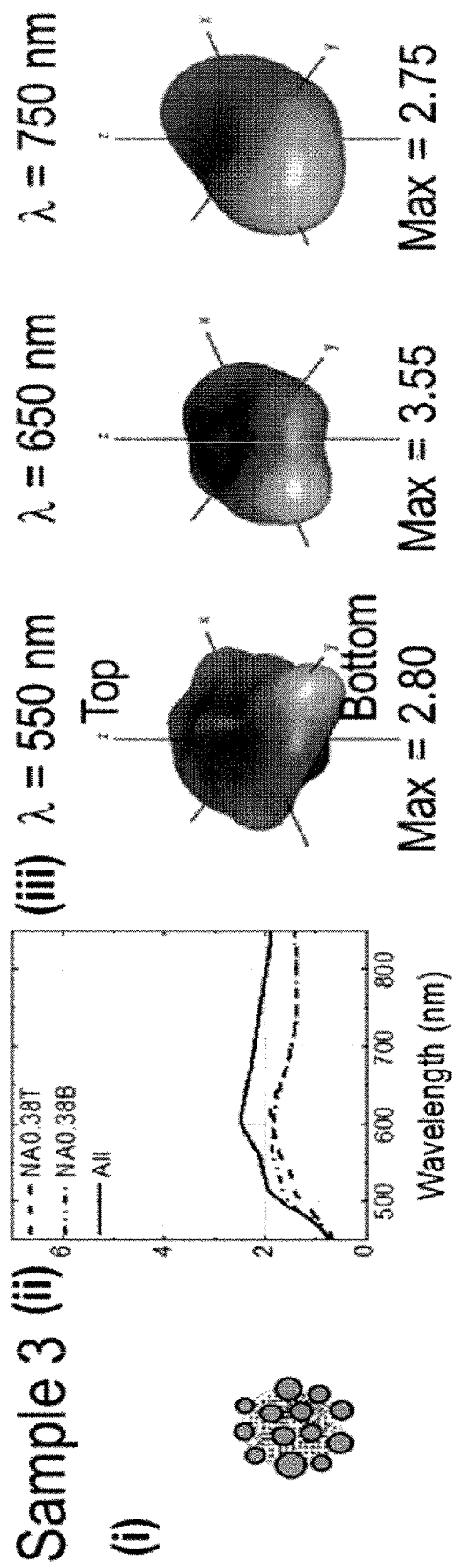
FIG. 6C shows (i) a top planar view of another nano-antenna (Sample 3); (ii) a plot of enhancement factor as a function of wavelengths (in nanometers or nm) of the nano-antenna shown in (i) showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i).

FIG. 6C shows (i) a top planar view of another nano-antenna (Sample 3); (ii) a plot of enhancement factor as a function of wavelengths (in nanometers or nm) of the nano-antenna shown in (i) showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i).

The nano-antenna of FIG. 6C includes nanostructures with different diameters between 80 nm and 120 nm and separations between nanostructures varying between 30 nm and 100 nm. The diameters and separations are set randomly in the simulation, and the structure in part (i) shows one specific example drawn to scale. The heights of the nanostructures are set to be 150 nm. It may be seen from part (ii) that the total luminescence enhancement is in the range of 2 times from about 500 nm to about 800 nm. As seen in part (iii), the emission is mostly aligned parallel to the nano-antenna plane.

Figure 6D:
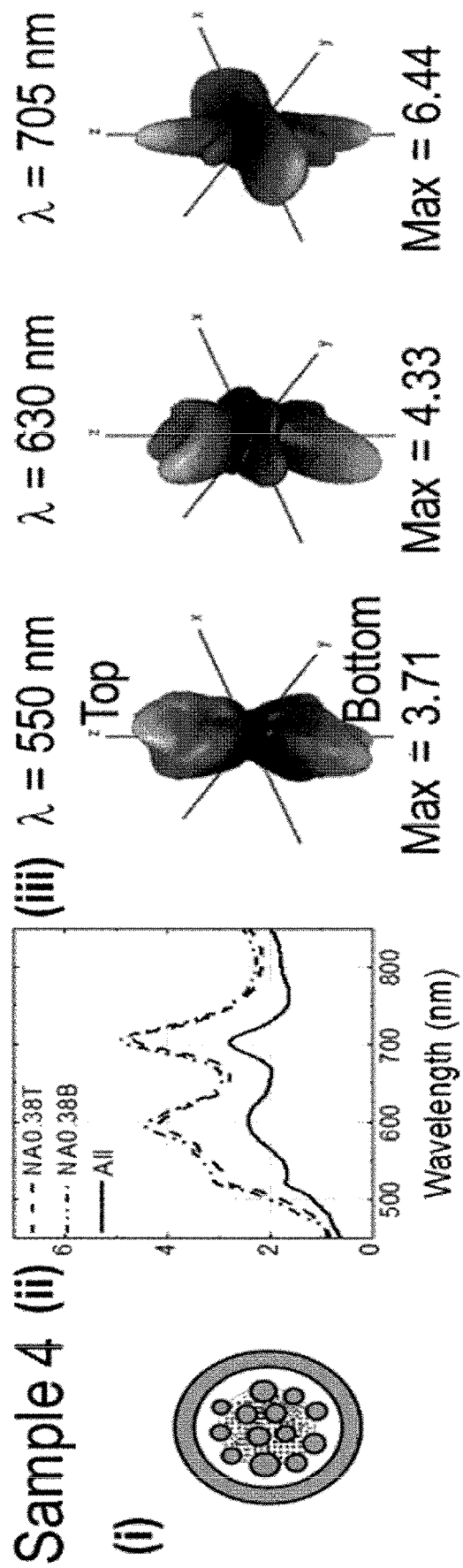
FIG. 6D shows (i) a top planar view of a nano-antenna according to various embodiments (Sample 4); (ii) a plot of enhancement factor as a function of wavelengths (in nanometers or nm) of the nano-antenna shown in (i) according to various embodiments showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i) according to various embodiments.

FIG. 6D shows (i) a top planar view of a nano-antenna according to various embodiments (Sample 4); (ii) a plot of enhancement factor as a function of wavelengths (in nanometers or nm) of the nano-antenna shown in (i) according to various embodiments showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i) according to various embodiments.

Figure 6E:
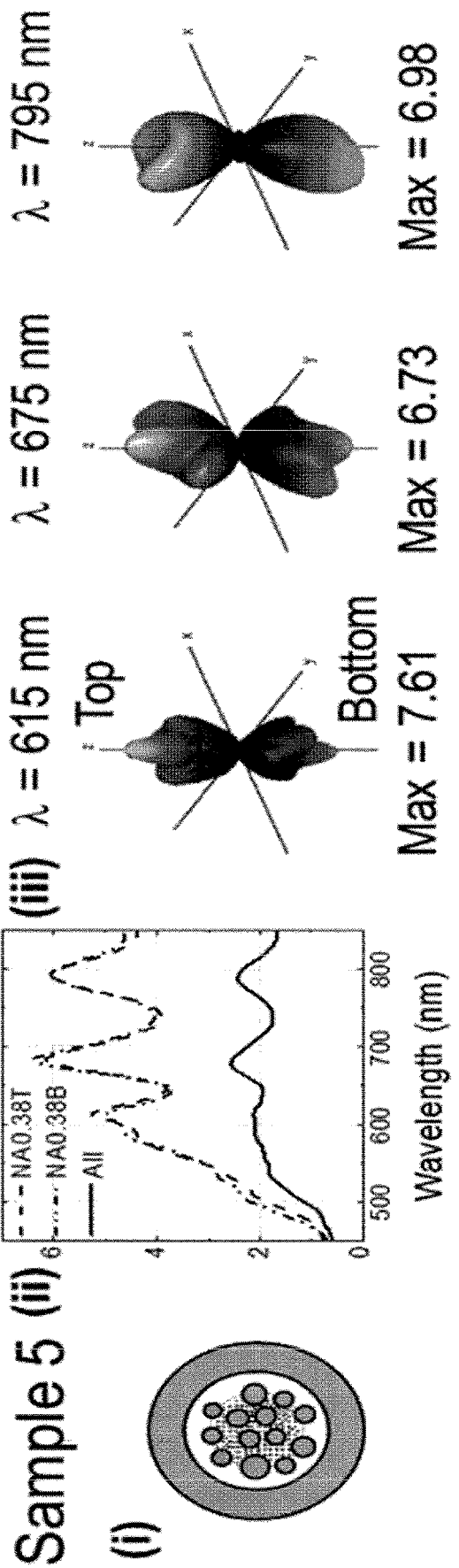
FIG. 6E shows (i) a top planar view of another nano-antenna according to various embodiments (Sample 5); (ii) a plot of enhancement factor as a function of wavelengths (in nanometers or nm) of the nano-antenna shown in (i) according to various embodiments showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i) according to various embodiments.

FIG. 6E shows (i) a top planar view of another nano-antenna according to various embodiments (Sample 5); (ii) a plot of enhancement factor as a function of wavelengths (in nanometers or nm) of the nano-antenna shown in (i) according to various embodiments showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i) according to various embodiments.

Figure 6F:
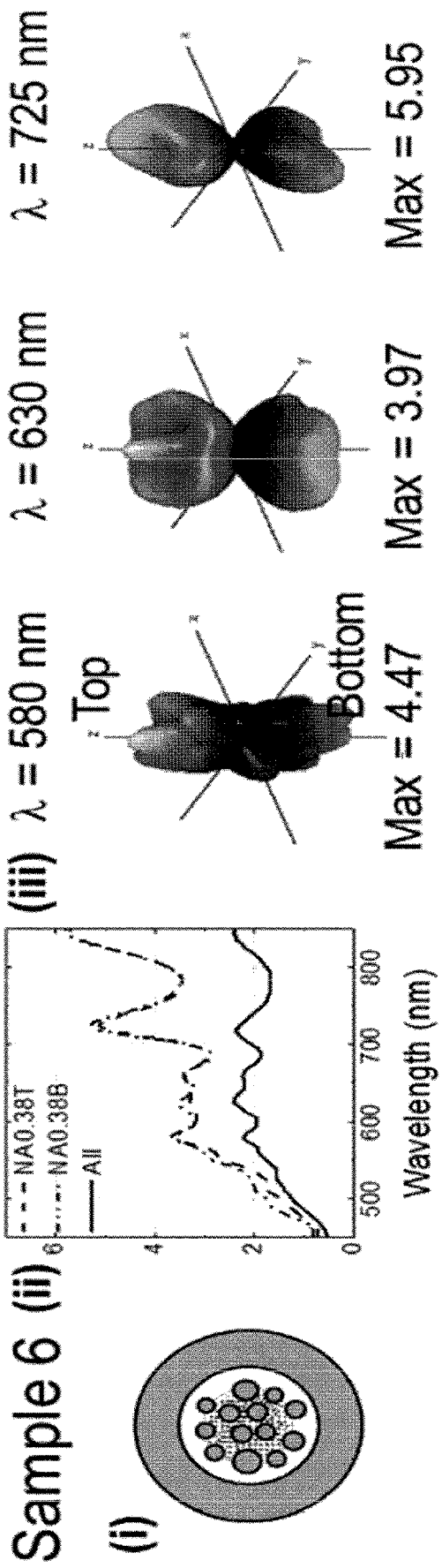
FIG. 6F shows (i) a top planar view of another nano-antenna according to various embodiments (Sample 6); (ii) a plot of enhancement factor as a function of wavelengths (in nanometers or nm) of the nano-antenna shown in (i) according to various embodiments showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i) according to various embodiments.

FIG. 6F shows (i) a top planar view of another nano-antenna according to various embodiments (Sample 6); (ii) a plot of enhancement factor as a function of wavelengths (in nanometers or nm) of the nano-antenna shown in (i) according to various embodiments showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i) according to various embodiments.

Figure 6G:
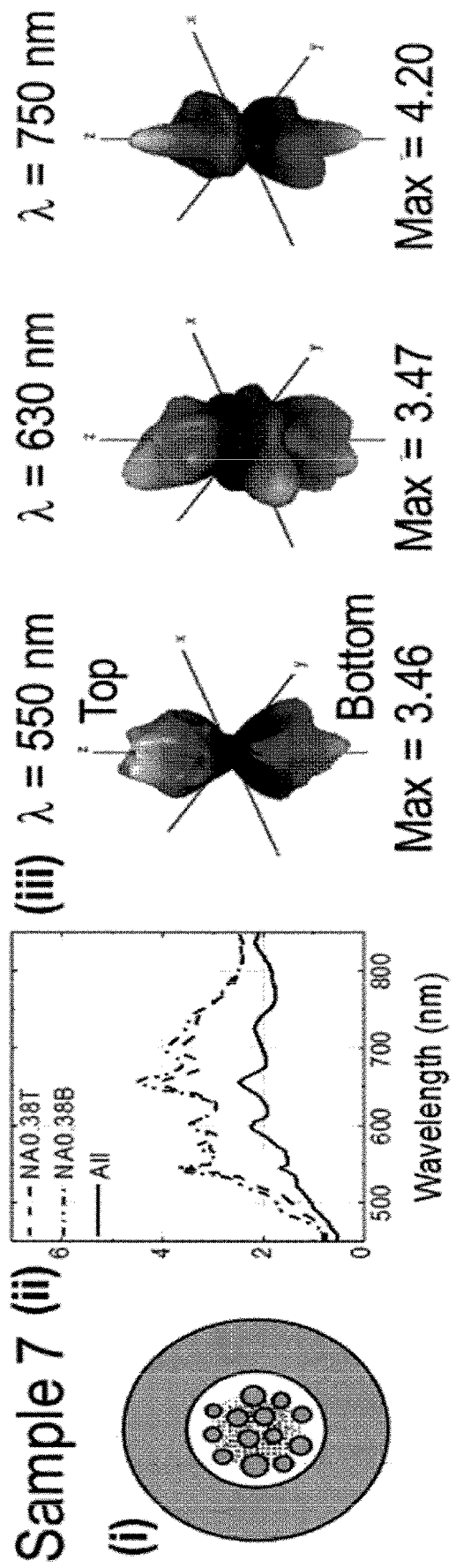
FIG. 6G shows (i) a top planar view of a nano-antenna according to various embodiments (Sample 7); (ii) a plot of enhancement factor as a function of wavelengths (in nanometers or nm) of the nano-antenna shown in (i) according to various embodiments showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i) according to various embodiments.

FIG. 6G shows (i) a top planar view of a nano-antenna according to various embodiments (Sample 7); (ii) a plot of enhancement factor as a function of wavelengths (in nanometers or nm) of the nano-antenna shown in (i) according to various embodiments showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i) according to various embodiments.

Samples 4-7 each has an arrangement of nanostructures that is similar to Sample 3, but also includes a ridge with a circular ring shape. The circular ridge has a thickness of 150 nm. The widths of the ridge for Samples 4-7 vary from 80 nm (Sample 4), to 160 nm (Sample 5), 200 nm (Sample 6) and 320 nm (Sample 7). The minimum separation between the nanoparticles and the inner wall of the ridge is of 50 nm. It can be seen that the total enhancement has not changed much compared to Sample 3 but the directivity is improved for all Samples 4-7. FIGS. 6D-G show that the directivity pattern may depend on the ridge width and there may be an optimum width for a particular spectral region.

For example, when the ridge has a width of 80 nm (Sample 4), the maximum directional enhancement of about 4.9 is obtained at about 705 nm wavelength. For a wider ridge of 160 nm (Sample 5), there are 3 directional enhancement maxima at about 615 nm, 675 nm, and 795 nm, which cover the large part of the visible spectrum. The peak enhancement at about 675 nm is above 6. For an even wider ridge of 320 nm (Sample 7), the main enhancement maxima shifts out of the visible range to the infra-red range, and the peak enhancement factor decreases.

Figure 6H:
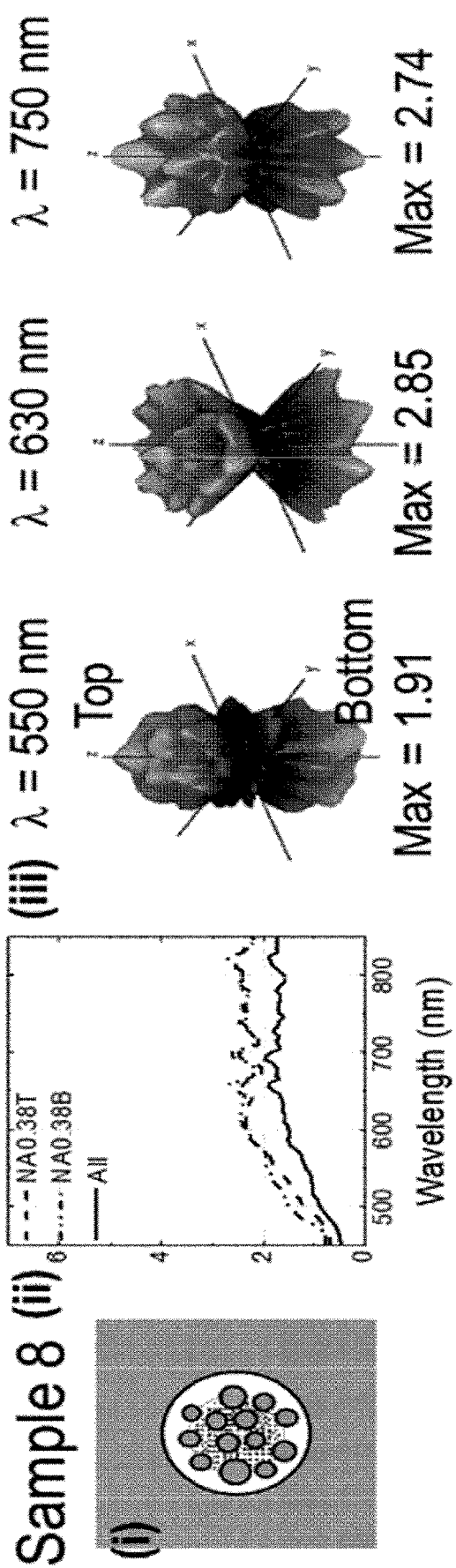
FIG. 6H shows (i) a top planar view of a nano-antenna according to various embodiments (Sample 8); (ii) a plot of enhancement factor as a function of wavelengths (in nanometers or nm) of the nano-antenna shown in (i) according to various embodiments showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i) according to various embodiments.

FIG. 6H shows (i) a top planar view of a nano-antenna according to various embodiments (Sample 8); (ii) a plot of enhancement factor as a function of wavelengths (in nanometers or nm) of the nano-antenna shown in (i) according to various embodiments showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i) according to various embodiments.

Sample 8 also has an arrangement of nanostructures that is similar to Sample 3, but has a ridge that is simulated to extend to infinity. FIG. 6H shows that the directional emission may only be slightly enhanced.

The above examples show that the ridge may lead to strong luminescence enhancement in the out-of-plane directions. The performance of the nano-antenna in the required spectral range may be enhanced by appropriate design of the ridge.

Figure 6I:
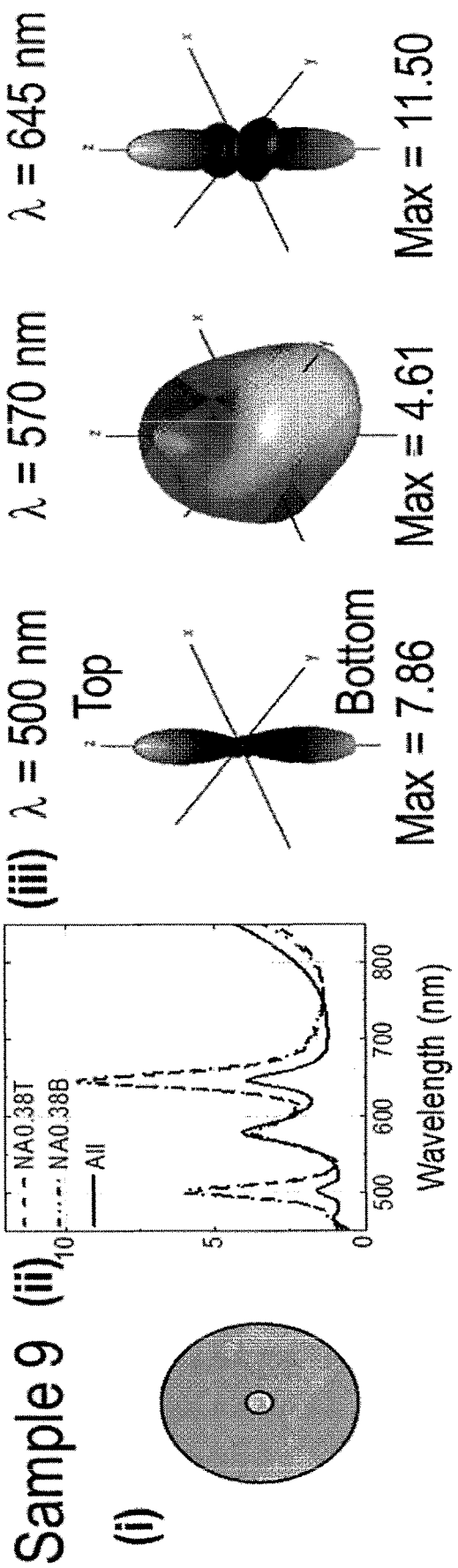
FIG. 6I shows (i) a top planar view of yet another nano-antenna according to various embodiments (Sample 9); (ii) a plot of enhancement factor as a function of wavelengths (in nanometers or nm) of the nano-antenna shown in (i) according to various embodiments showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i) according to various embodiments.

FIG. 6I shows (i) a top planar view of yet another nano-antenna according to various embodiments (Sample 9); (ii) a plot of enhancement factor as a function of wavelengths (in nanometers or nm) of the nano-antenna shown in (i) according to various embodiments showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i) according to various embodiments.

Figure 6J:
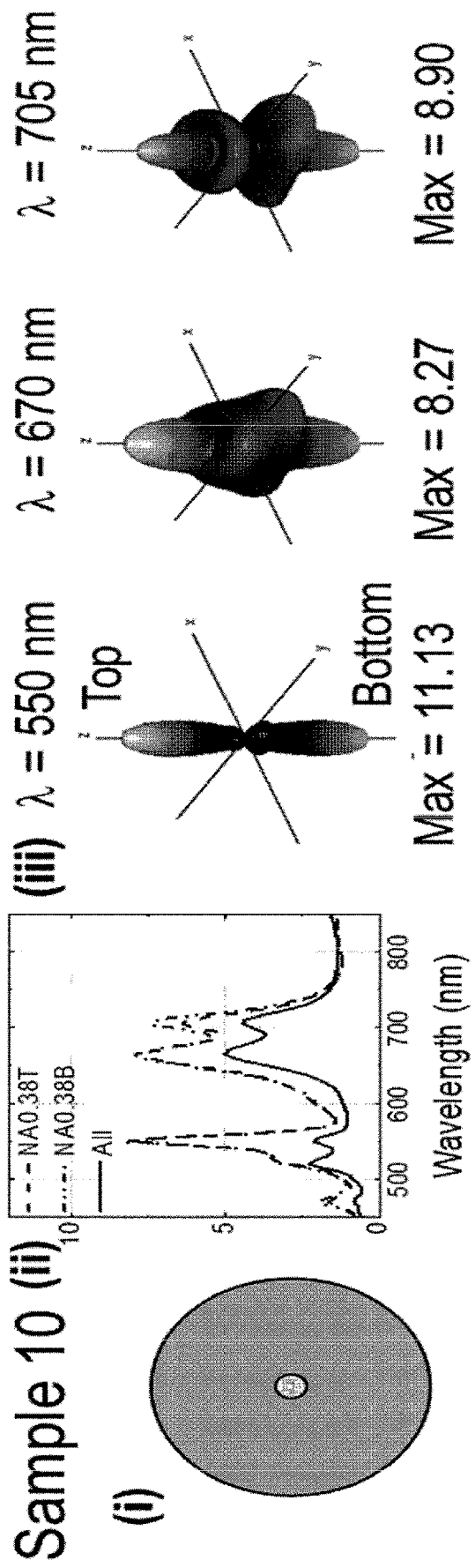
FIG. 6J shows (i) a top planar view of yet another nano-antenna according to various embodiments (Sample 10); (ii) a plot of enhancement factor as a function of wavelengths (in nanometers or nm) of the nano-antenna shown in (i) according to various embodiments showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i) according to various embodiments.

FIG. 6J shows (i) a top planar view of yet another nano-antenna according to various embodiments (Sample 10); (ii) a plot of enhancement factor as a function of wavelengths (in nanometers or nm) of the nano-antenna shown in (i) according to various embodiments showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i) according to various embodiments.

The nano-antennas illustrated in FIGS. 6I-J are without nanostructures, and consist of only a circular ring ridge. The ridges of Sample 9 and Sample 10 may have a height of about 150 nm, and an inner diameter of 50 nm. The width of the ridge in Sample 9 is about 160 nm, while the width of the ridge in Sample 10 is about 200 nm. The 50 randomly oriented dipoles are within the space defined by the ridge. The total enhancement factor may reach nearly 5, while the directional enhancement factor for Sample 9 may reach about 9.7 at a wavelength of about 645 nm, and about 6 at a wavelength of about 500 nm, and the directional enhancement factor for Sample 10 may reach about 8.1, about 7.6 and about 6.8 at wavelengths of about 550 nm, about 660 nm, and about 700 nm respectively.

FIGS. 6I-J show that the ridge alone without nanostructures or nanoparticles may play the role of an efficient directional antenna.

Figure 6K:
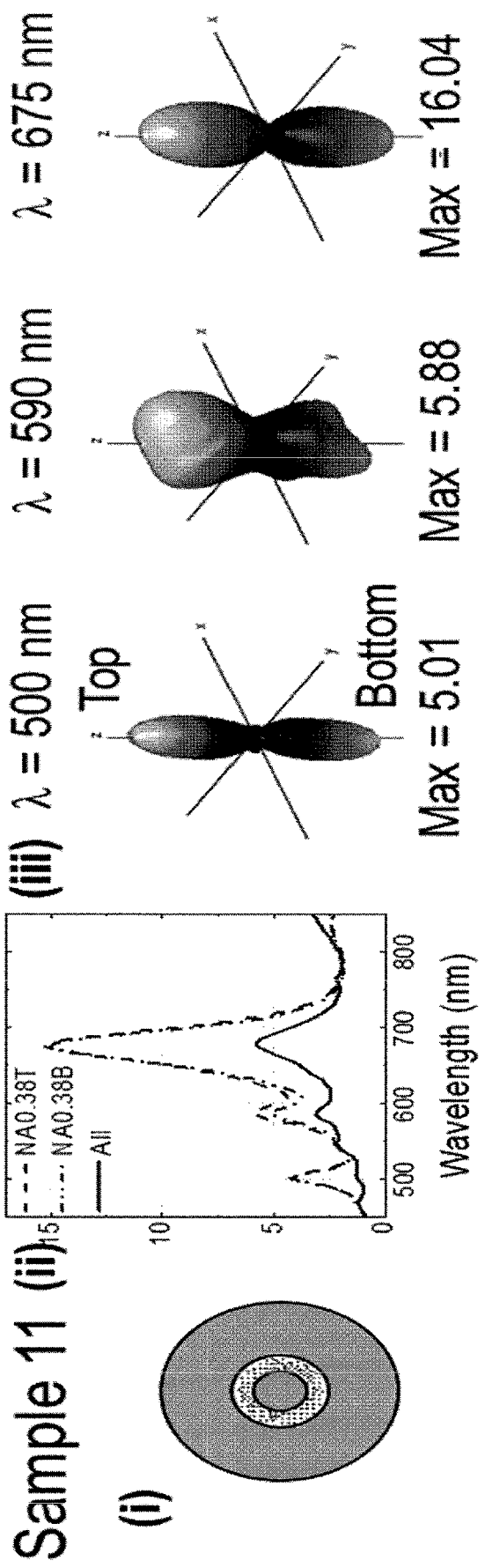
FIG. 6K shows (i) a top planar view of yet another nano-antenna according to various embodiments (Sample 11); (ii) a plot of enhancement factor as a function of wavelengths (in nanometers or nm) of the nano-antenna shown in (i) according to various embodiments showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i) according to various embodiments.

FIG. 6K shows (i) a top planar view of yet another nano-antenna according to various embodiments (Sample 11); (ii) a plot of enhancement factor as a function of wavelengths (in nanometers or nm) of the nano-antenna shown in (i) according to various embodiments showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i) according to various embodiments.

Figure 6L:
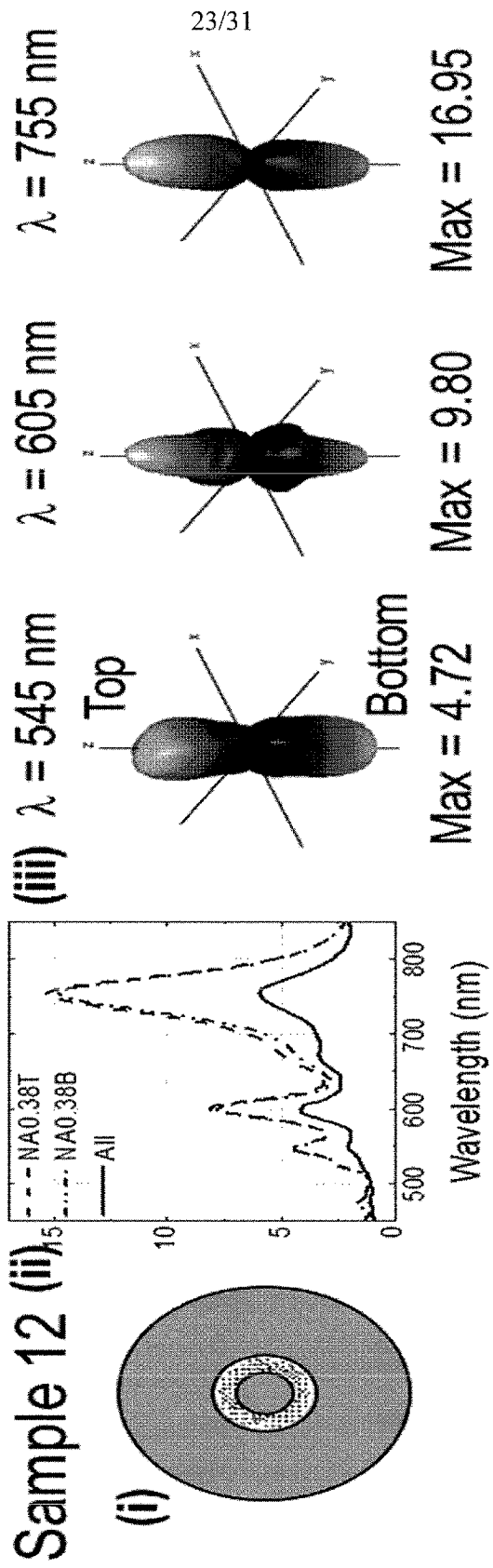
FIG. 6L shows (i) a top planar view of yet another nano-antenna according to various embodiments (Sample 11); (ii) a plot of enhancement factor as a function of wavelengths (in nanometers or nm) of the nano-antenna shown in (i) according to various embodiments showing the enhancement factors at the top of the nano-antenna (NA 0.38T), at the bottom of the nano-antenna (NA 0.38B) as well as overall enhancement factor (solid line); and (iii) three-dimensional (3D) emission diagrams of dipoles surrounding the nano-antenna shown in (i) according to various embodiments.

FIG. 6L shows (i) a top planar view of yet another nano-antenna according to various embodiments (Sample 11); (ii) a plot of enhancement factor as a function of wavelengths (in nanometers or nm) of the nano-antenna shown in (i) according to various embodiments showing the enhancement factors at the top of the nano-antenna (NA 0.38T), at the bottom of the nano-antenna (NA 0.38B) as well as overall enhancement factor (solid line); and (iii) a three-dimensional (3D) emission diagrams of dipoles surrounding the nano-antenna shown in (i) according to various embodiments.

Samples 11 and 12 show embodiments when only a single nanostructure having a cylindrical shape is surrounded by a ridge. The height of the nanostructure is about 150 nm, the diameter of the nanostructure is about 120 nm, and the gap between the nanostructure and the inner wall of the circular ridge is about 50 nm. The widths of the ridges in Sample 11 and Sample 12 are about 160 nm and about 200 nm respectively. Sample 11 may achieve a total enhancement of about 5.5 at a wavelength of about 670 nm, while Sample 12 may achieve a total enhancement of about 6 at a wavelength of about 750 nm. Further, Sample 11 may show a directional enhancement of about 15 at a wavelength of about 670 nm, while Sample 12 may show a directional enhancement of about 15 at a wavelength of about 750 nm. It can be seen that the changing the ridge width may tailor the signal enhancement at a particular wavelength or range of wavelengths.

The description of the various samples are summarized below:

projected onto the back-focal plane of the objective lens 702. The intensity distributions of the light emission may be analyzed by the back-focal plane imaging. The antennas may be located at the sample surface and may be evenly covered by a layer of localized emitters, quantum dots. A buffer solution containing the quantum dots may be coated onto the sample. The antennas and the localized emitters may also be covered by a superstate layer with a refractive index close to that of the substrate.

The antennas may be fabricated from amorphous silicon. In the experiments, the nano-antennas of Sample 2 shown in FIG. 6B and Sample 5 shown in FIG. 6E may be formed on quartz substrates by electron-beam (e-beam) lithography. The emission wavelengths of the quantum dots are from about 650 nm to about 750 nm. The excitation wavelength used in the measurement experiments is about 488 nm. As highlighted above, the emitted light is collected by the oil immersion objective lens 402 with numerical aperture of 1.25 and projected to the back-focal plane of the lens 402. The intensity distribution in the back-focal plane is imaged by a color charged-coupled detector (CCD) camera. Light intensity distribution in the back focal plane may provide information about angular emission pattern of the sample.

Figure 7A:
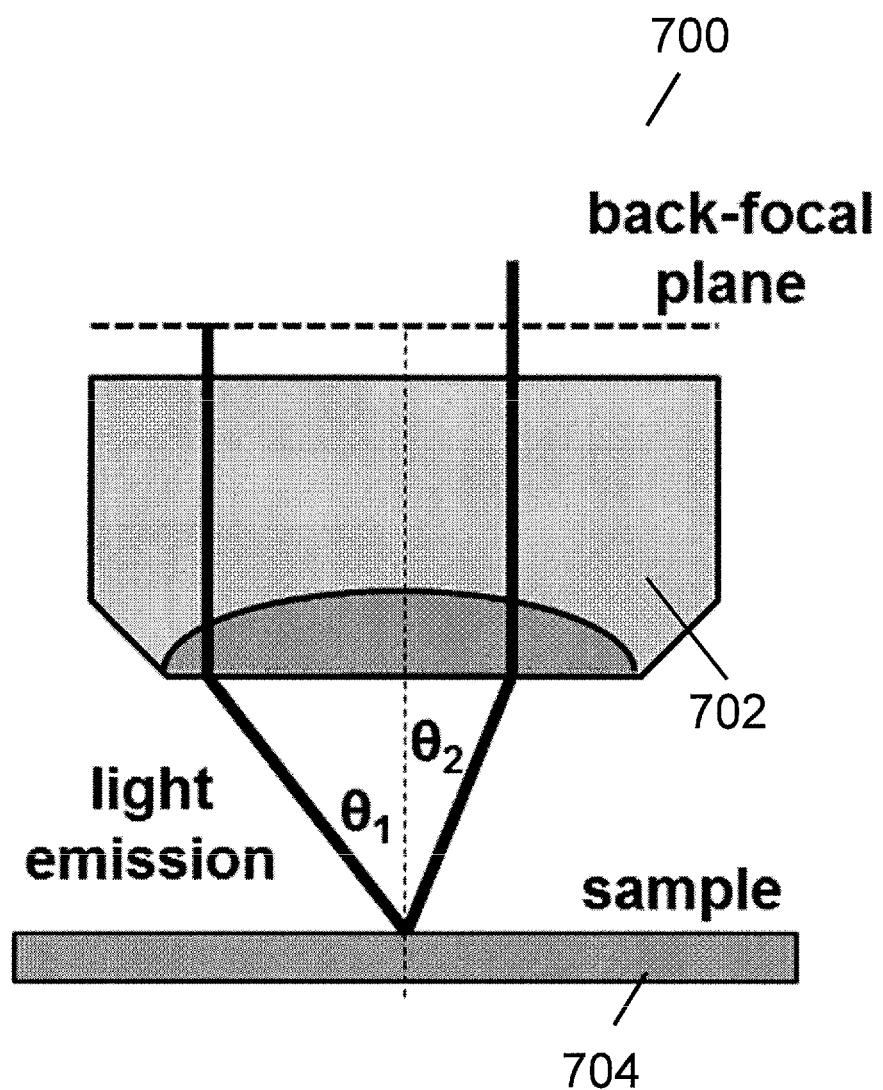
FIG. 7A shows a schematic of a setup to determine the light emission of an antenna according to various embodiments.
Figure 7B:
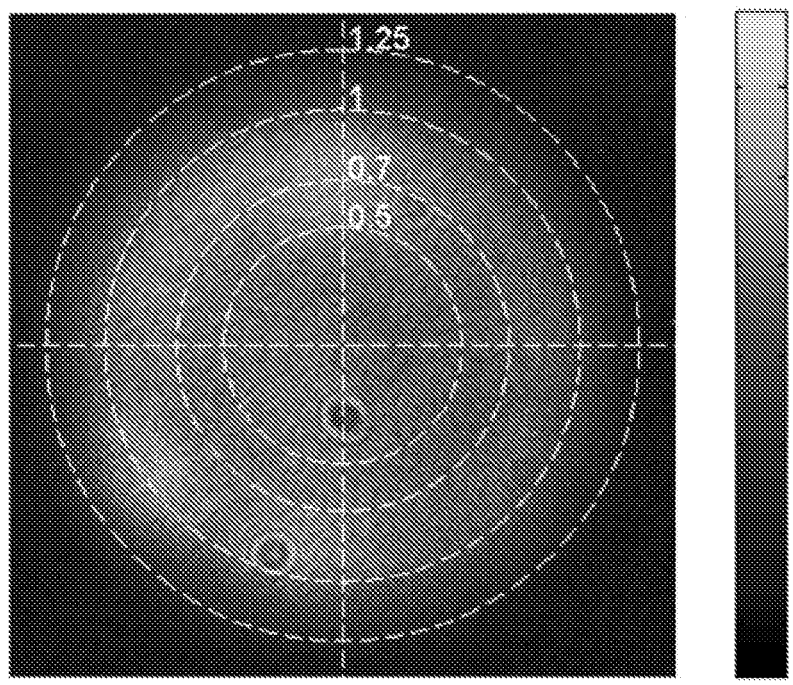
FIG. 7B shows an image of the intensity distribution in the back-focal plane from a sample without the nano-antenna.

FIG. 7B shows an image of the intensity distribution in the back-focal plane from a sample without the nano-antenna. A fairly uniform intensity may be seen, represent-

| Sample | Detail description |
|---|---|
| Sample 1 | 7 cylindrical nanostructures with same size, diameters of 120 nm, height of 150 nm, and hexagonal arrangement. The gap between the nanostructures is 50 nm. |
| Sample 2 | The same nanostructure arrangement as Sample 1 but the nanostructures are surrounded by a ridge with hexagonal ring shape. The ridge has a rectangular cross-section with the width of 160 nm and a height of 150 nm, which is the same as the height of the nanostructures. The minimum gap between the nanostructures and the internal surface of the ridge is set at 50 nm. |
| Sample 3 | Cylindrical nanostructures with the height of 150 nm and diameters randomly varied between 80 nm and 120 nm. The nanostructures are randomly positioned with separations varied between 30 nm and 100 nm. Only one particular realization is chosen as Sample 3. |
| Sample 4 | The same nanostructure arrangement as Sample 3 but the nanostructures are surrounded by a ridge with circular ring shape. The ridge has a rectangular cross-section with a width of 80 nm and a height of 150 nm, which is the same as the height of the nanostructures. The minimum gap between the nanostructures and the inner surface of the ridge is 50 nm. |
| Sample 5 | A similar structure as Sample 4 but the width of ridge is 160 nm. |
| Sample 6 | A similar structure as Sample 4 but the width of ridge is 200 nm. |
| Sample 7 | A similar structure as Sample 4 but the width of ridge is 320 nm. |
| Sample 8 | A similar structure as Sample 4 but the width of the ridge is extended to infinity. |
| Sample 9 | Circular ring ridge with height of 150 nm, inner diameter of 50 nm, and width of 160 nm. |
| Sample 10 | A structure similar to Sample 9 but the width of the ridge is of 200 nm. |
| Sample 11 | Single cylindrical nanostructure is surrounded by a ridge. The diameter of the nanostructure is 120 nm, the height is of 150 nm, and the gap between the nanostructure and the inner wall of the circular ridge is 50 nm. The width of the ridge is 160 nm. |
| Sample 12 | Similar structure as Sample 11, but the width of the ridge is of 160 nm. |

In various embodiments, a width of the ridge reflector may be a value selected from a range of about 80 nm to about 320 nm, e.g. of about 160 nm to about 200 nm. In various embodiments, the directional enhancement factor of the antenna may exceed 4, e.g. exceed 5, e.g. exceed 6, e.g. exceed 9, e.g. exceed 10, e.g. exceed 15.

FIG. 7A shows a schematic of a setup 700 to determine the light emission of an antenna according to various embodiments. The setup 700 may include an objective lens 702, which may be used to collect light emission from the antenna located on a surface of the sample 704. Light emitted at different angles (e.g. $\theta_1$, $\theta_2$ from normal) from the antenna may be collected by the objective lens 702 and ing the uniform emission in all directions of the quantum dots on the sample without the nano-antenna.

Figure 7C:
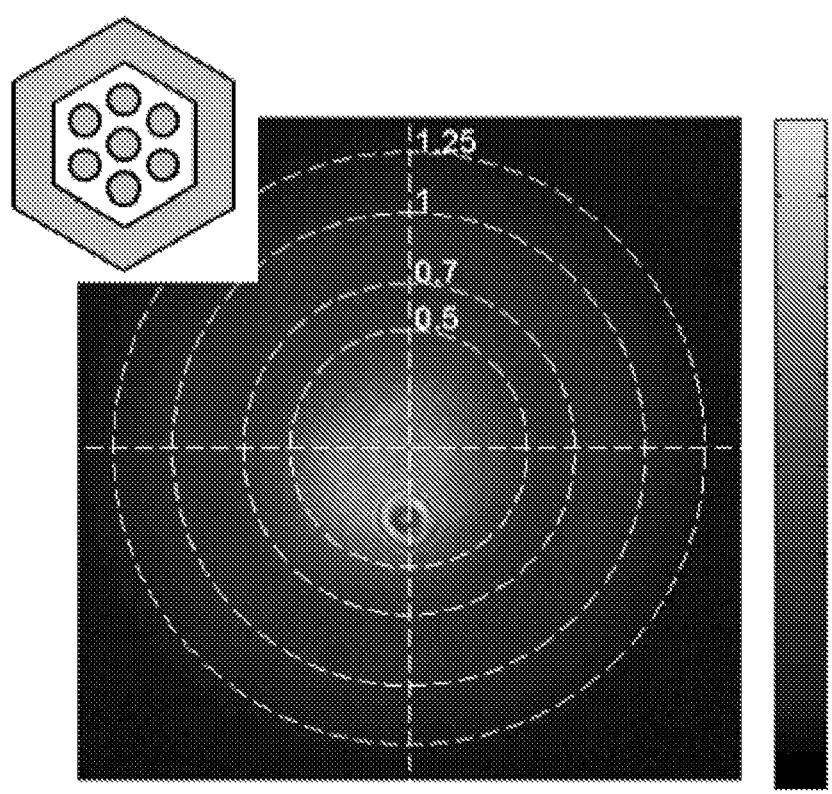
FIG. 7C shows an image of the intensity distribution in the back-focal plane from a sample with the nano-antenna according to various embodiments shown in the inset.

FIG. 7C shows an image of the intensity distribution in the back-focal plane from a sample with the nano-antenna according to various embodiments shown in the inset. The nano-antenna in the inset of FIG. 7C corresponds to the nano-antenna of Sample 2 shown in FIG. 6B.

Figure 7D:
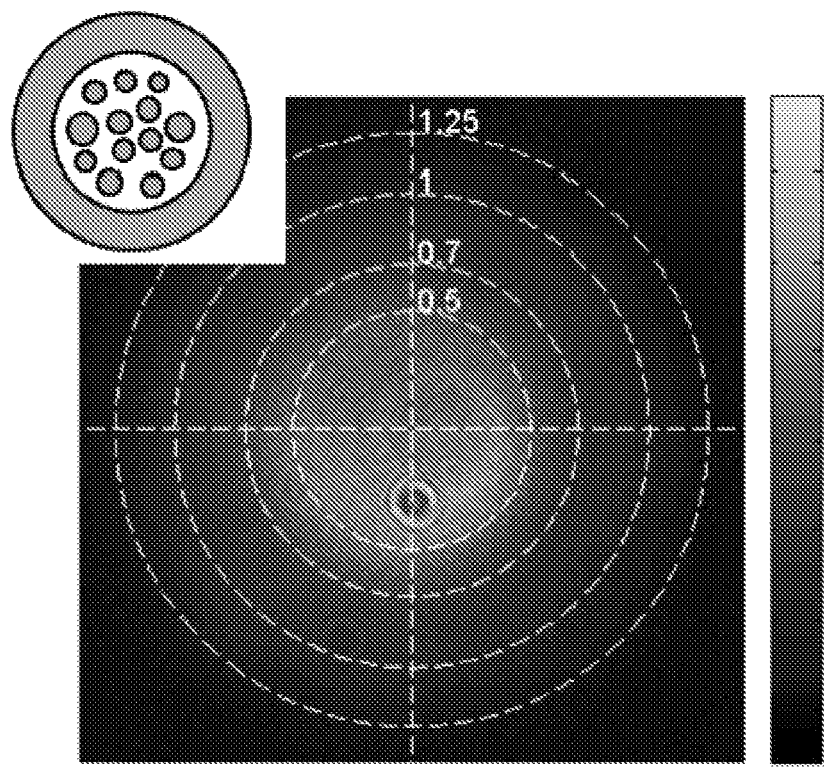
FIG. 7D shows an image of the intensity distribution in the back-focal plane from a sample with the nano-antenna according to various embodiments shown in the inset.

FIG. 7D shows an image of the intensity distribution in the back-focal plane from a sample with the nano-antenna according to various embodiments shown in the inset. The nano-antenna in the inset of FIG. 7D corresponds to the nano-antenna of Sample 5 shown in FIG. 6E.

In FIGS. 7B-D, the electromagnetic wave signals are collected from a sample surface area with an approximate diameter of 0.5 microns, which is similar the diameter of the nano-antenna. A scale of intensity is provided on the right in FIGS. 7B-D.

The enhancement of emission directivity may be observed in FIGS. 7C-D. The middle of the focal plane (corresponding to the direction perpendicular to the sample surface) shows higher intensity. Total enhancement factors (obtained by dividing integrated electromagnetic wave signal emitted by a electromagnetic wave source in the presence of an nano-antenna, with the integrated electromagnetic wave signal emitted by the electromagnetic wave source without the nano-antenna) of 1.65 and 1.39 may be achieved for samples shown in FIGS. 7C and 7D respectively. The directional enhancement (obtained by dividing integrated electromagnetic wave signal emitted by a electromagnetic wave source in the presence of an nano-antenna and captured by 0.38 NA lens, with the integrated electromagnetic wave signal emitted by the electromagnetic wave source without the nano-antenna and captured by 0.38 NA lens) for samples in FIGS. 7C and 7D are 3.24 and 2.46 respectively.

The above examples demonstrate that the fabricated nano-antenna designs may enhance the total emission and emission directivity of localized electromagnetic wave sources located around the nano-antennas in directions perpendicular to the nanoantenna/sample plane.

The experimentally obtained numbers of directional enhancement are somewhat lower than theoretically predicted for Sample 2 and Sample 5. This may be explained by the design of the experiments. In the experiments, the quantum dots are uniformly distributed over the sample surface in a film. The thickness of the quantum dots film and density of the quantum dots are fixed. This leads to a situation in which the amount of emitters in the measured nano-antenna area is lower than the amount of emitters in the measured blank area (without nano-antenna) due to the fact that the nano-antenna occupies a certain volume by itself (thus no emitters are present in the volume occupied by the nano-antenna). In practical situations when the number of emitters located near the nano-antenna is fixed, values approaching the theoretically predicted values of fluorescence enhancement may be expected.

Figure 8A:
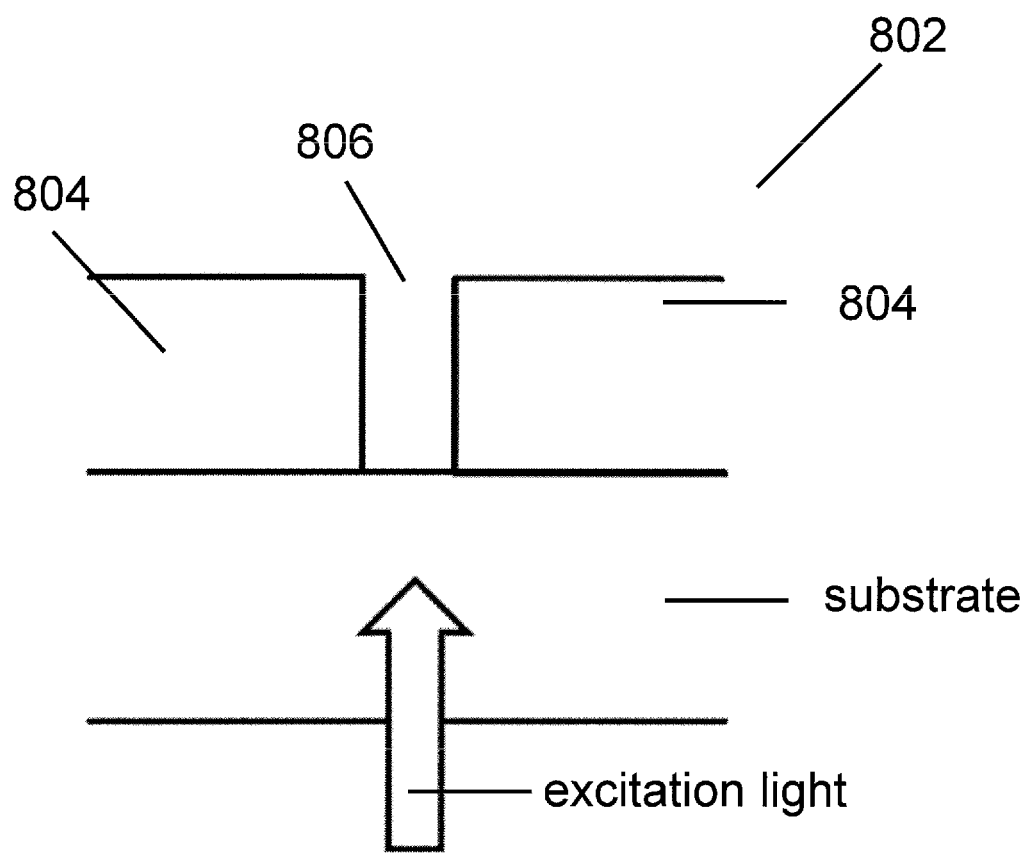
FIG. 8A shows (i) a schematic of a zero mode waveguide.

Various embodiments may be included in an assembly such as a florescence readout system including a zero mode waveguide such as that shown in FIG. 8A. FIG. 8A shows a schematic of a zero mode waveguide 802. The waveguide 802 may be used for deoxyribonucleic acid (DNA) sequencing using a fluorescence detection method described in U.S. Pat. No. 6,917,726 B2, U.S. Pat. No. 7,013,054 B2, and Levene et al., "Zero-Mode Waveguides For Single—Molecule Analysis at High Concentrations", Science 200, 682, 2003, which are incorporated herein for reference.

The zero-mode waveguide 802 may include a cladding 804 (e.g. aluminum) surrounding a core 806 (e.g. aperture filled with a liquid), where the cladding 804 is configured to preclude propagation of electromagnetic energy at pump and emission frequencies through the core 806 of the zero-mode waveguide 802.

Figure 8B:
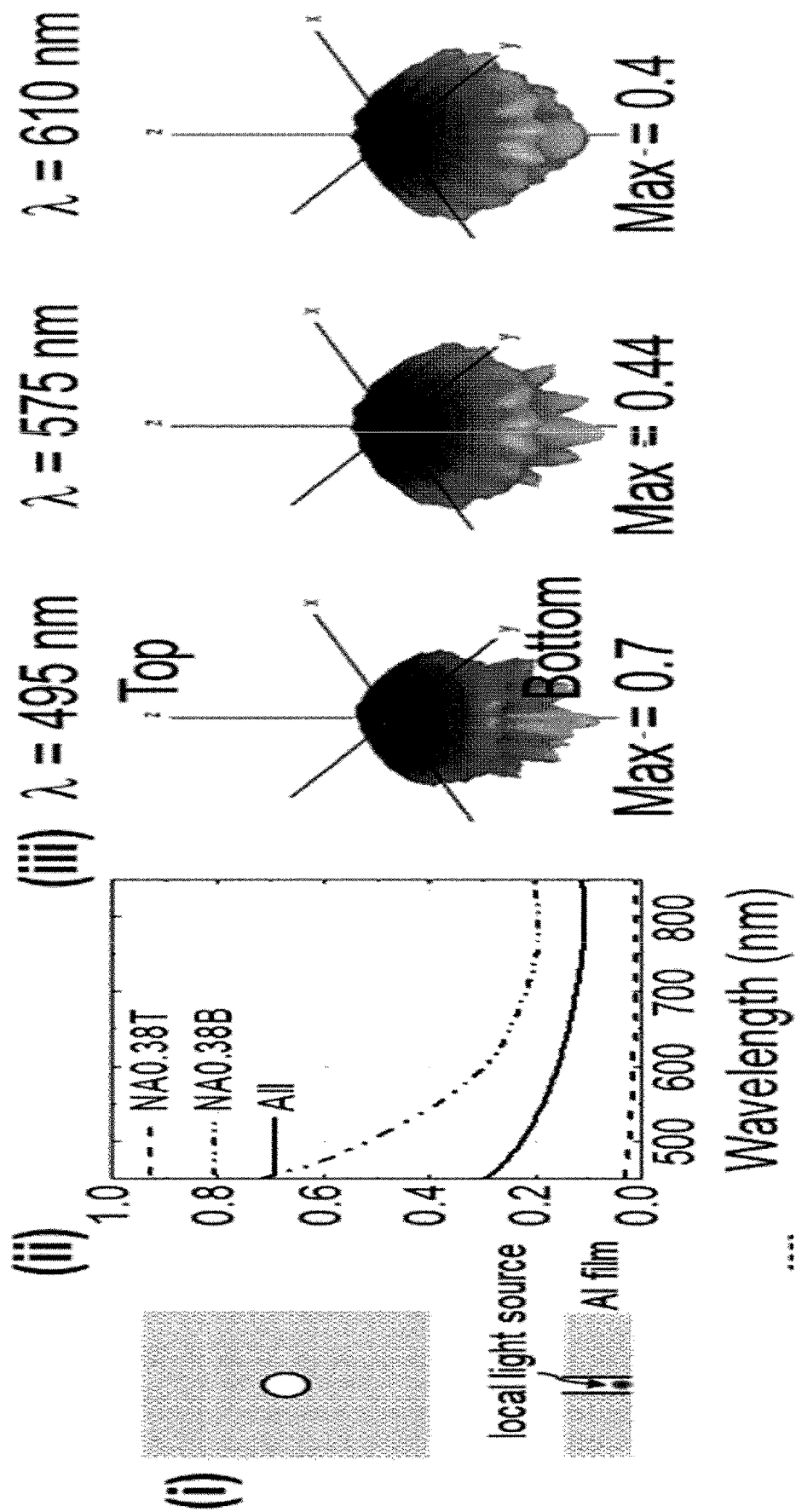
FIG. 8B shows (i) a schematic of a zero-mode waveguide, (ii) a plot of enhancement factor as a function of wavelengths (in nanometers or nm) of the zero-mode waveguide in (i) showing the enhancement factors at the bottom of the zero-mode waveguide (NA 0.38B) as well as overall enhancement factor (solid line); and (iii) three-dimensional (3D) emission diagrams of dipoles surrounding the zero-mode waveguide shown in (i).

Based on the configuration, the fluorescence emission may be excited only in an effective observation volume at the bottom of the core of the zero-mode waveguide to avoid the background noise. FIG. 8B shows (i) a schematic of a zero-mode waveguide, (ii) a plot of enhancement factor as a function of wavelengths (in nanometers or nm) of the zero-mode waveguide in (i) showing the enhancement factors at the bottom of the zero-mode waveguide (NA 0.38B) as well as overall enhancement factor (solid line); and (iii) three-dimensional (3D) emission diagrams of dipoles surrounding the zero-mode waveguide shown in (i).

Figure 8C:
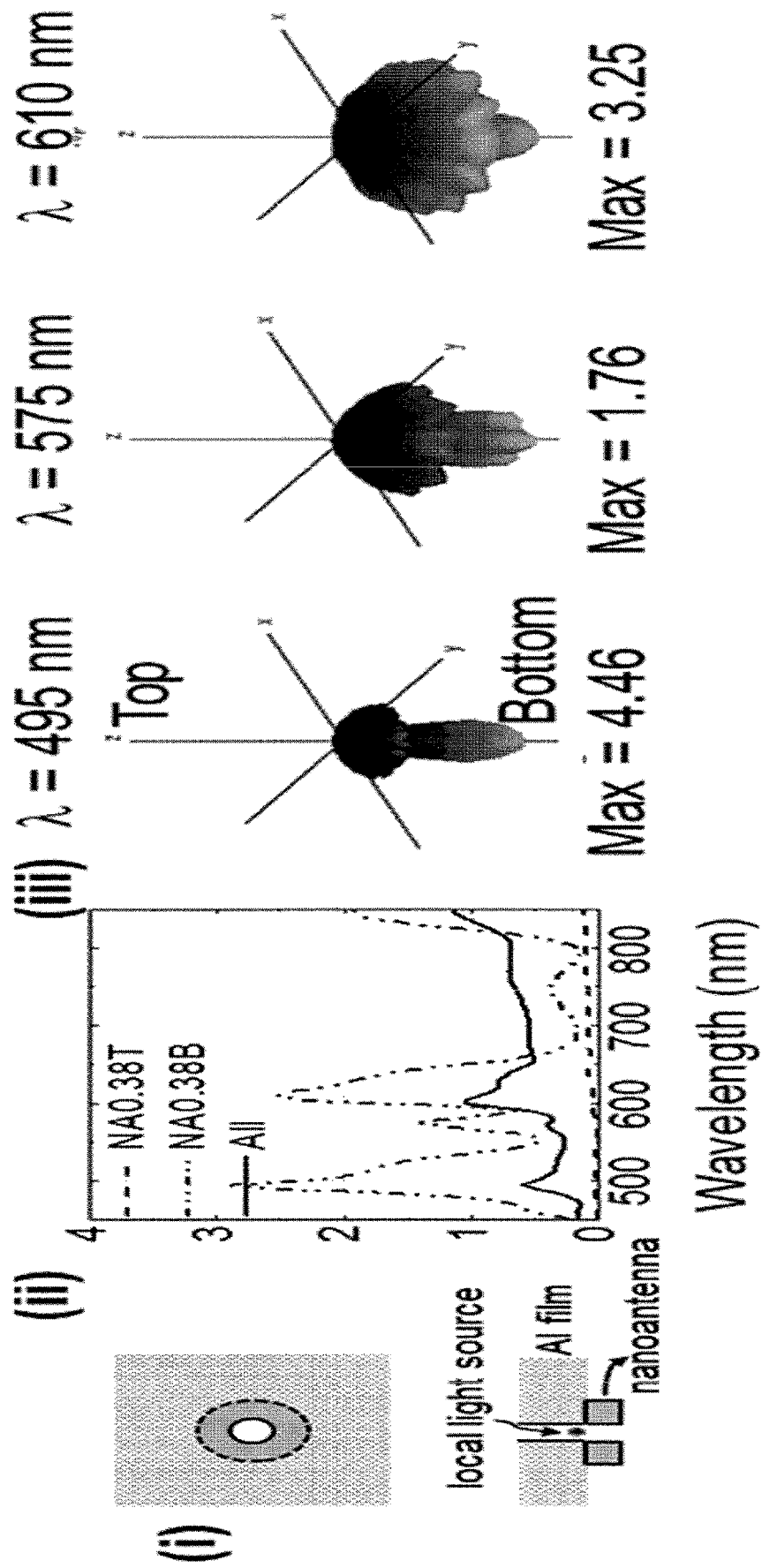
FIG. 8C shows (i) a schematic of a zero-mode waveguide with an antenna according to various embodiments, (ii) a plot of enhancement factor as a function of wavelengths (in nanometers or nm) of the zero-mode waveguide with the antenna according to various embodiments in (i) showing the enhancement factors at the bottom of the zero-mode waveguide with the antenna (NA 0.38B) as well as overall enhancement factor (solid line); and (iii) three-dimensional (3D) emission diagrams of dipoles surrounding the zero-mode waveguide with the antenna shown in (i) according to various embodiments.

FIG. 8C shows (i) a schematic of a zero-mode waveguide with a nano-antenna according to various embodiments, (ii) a plot of enhancement factor as a function of wavelengths (in nanometers or nm) of the zero-mode waveguide with the nano-antenna according to various embodiments in (i) showing the enhancement factors at the bottom of the zero-mode waveguide with the nano-antenna (NA 0.38B) as well as overall enhancement factor (solid line); and (iii) three-dimensional (3D) emission diagrams of dipoles surrounding the zero-mode waveguide with the nano-antenna shown in (i) according to various embodiments.

The zero-mode waveguide in FIGS. 8B-C may include an aluminum film with thickness of 150 nm, and a small aperture with diameter of about 50 nm extending through the aluminum film. The structure may be surrounded by a homogeneous medium with refractive index of 1.4. Three orthogonal dipoles may be located at the axis of the aperture at 10 nm elevation from the bottom to simulate an incoherent fluorescence electromagnetic wave source. It can be seen in FIG. 8B that some fluorescence is quenched and the total enhancement factor is around 0.2. The directional enhancement factor towards the bottom direction is about two times higher than the total enhancement factor through the major part of the visible spectrum. This is also confirmed by the 3D emission patterns, which are aligned towards the bottom direction.

In FIG. 8C, the same zero-mode waveguide may be combined with a silicon ring nano-antenna (the silicon ring nano-antenna may be similar to that of sample 9 shown in FIG. 6I) beneath the waveguide. The nano-antenna may be in contact with the waveguide. The position of the local electromagnetic wave source is the same as in FIG. 8B. It can be observed that the total enhancement factor of the assembly may be around 1. It can also be seen that the directional enhancement factors may be about 4.9, 3.7 and 2.7 times higher than the total enhancement factors at the wavelengths of about 495 nm, 575 nm and 610 nm respectively.

Figure 8D:
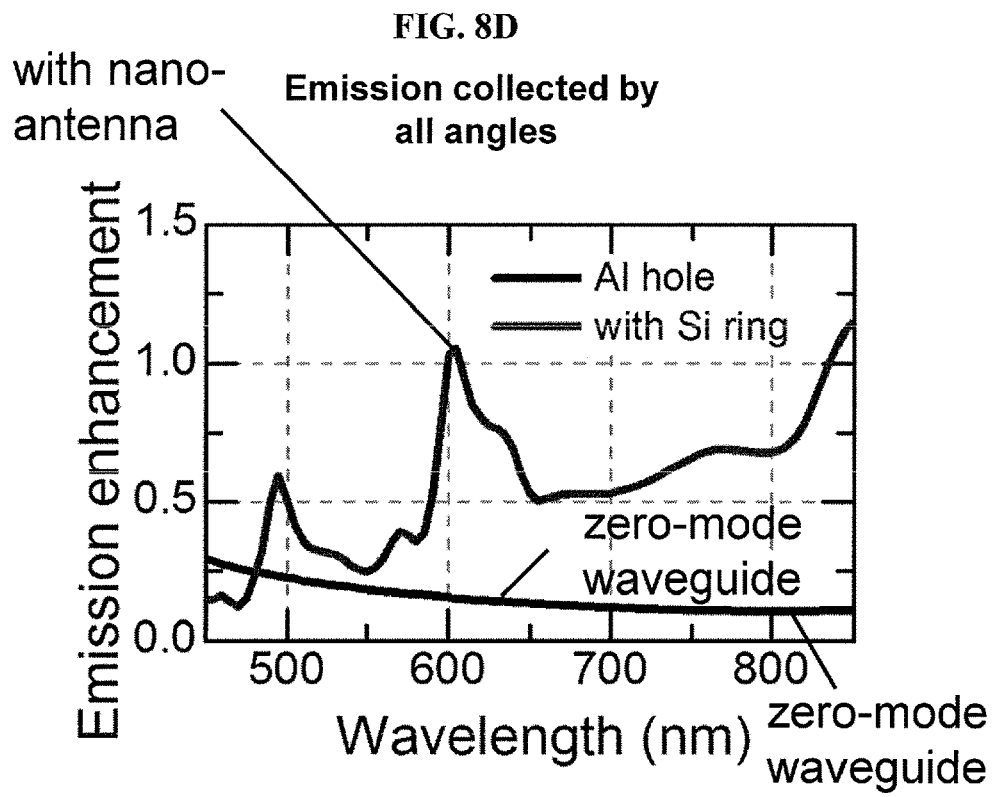
FIG. 8D is a plot of enhancement factor as a function of wavelengths (in nanometers or nm) showing the total enhancement factors of the zero-mode waveguide, as well as the zero-mode waveguide with the antenna according to various embodiments.

FIG. 8D is a plot of enhancement factor as a function of wavelengths (in nanometers or nm) showing the total enhancement factors of the zero-mode waveguide, as well as the zero-mode waveguide with the nano-antenna according to various embodiments.

Figure 8E:
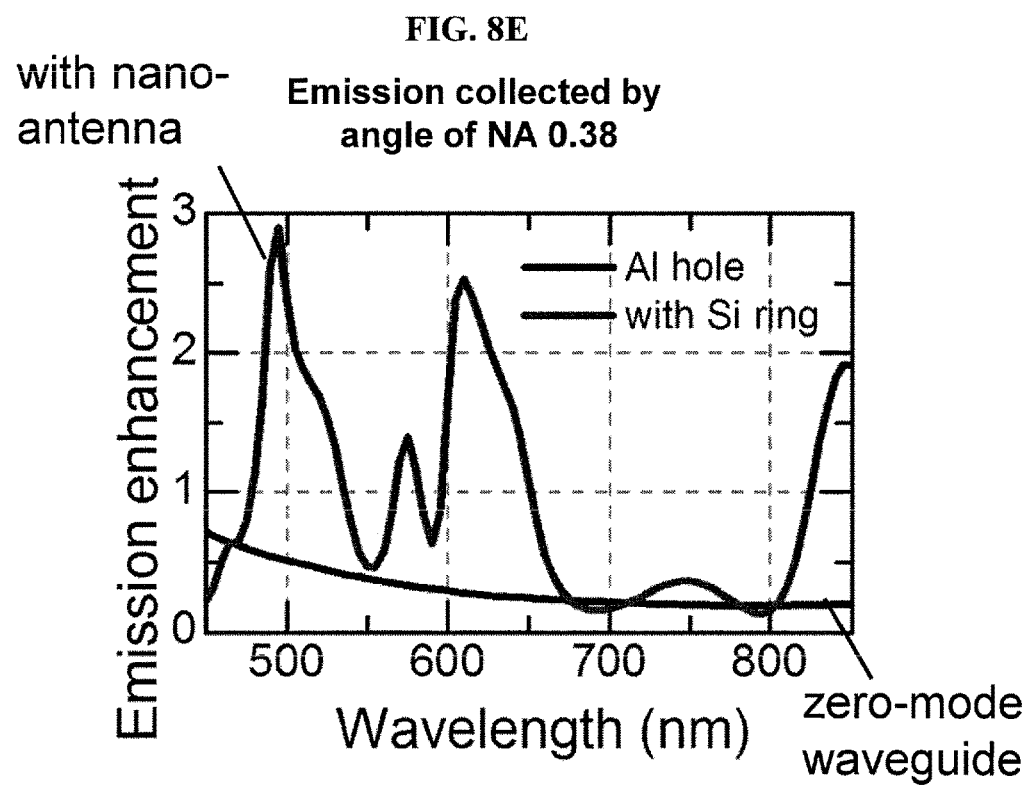
FIG. 8E is a plot of enhancement factor as a function of wavelengths (in nanometers or nm) showing the directional enhancement factors of the zero-mode waveguide, as well as the zero-mode waveguide with the nano-antenna according to various embodiments.

FIG. 8E is a plot of enhancement factor as a function of wavelengths (in nanometers or nm) showing the directional enhancement factors of the zero-mode waveguide, as well as the zero-mode waveguide with the nano-antenna according to various embodiments.

The abovementioned show that nano-antennas may effectively work with zero-mode waveguides.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An assembly comprising:
   an antenna comprising a ridge reflector arranged along a plane; and
   at least one electromagnetic wave source;

wherein the ridge reflector is configured to enhance an emission of the at least one electromagnetic wave source providing an electromagnetic wave signal to the antenna and further configured to direct the electromagnetic wave signal in a direction at least substantially perpendicular to the plane;

wherein the ridge reflector defines a space along the plane for allowing the electromagnetic wave signal to be directed in the direction at least substantially perpendicular to the plane;

wherein the ridge reflector comprises at least one of a dielectric material and a semiconductor material;

wherein the ridge reflector is a continuous structure surrounding the space; and wherein the at least one electromagnetic wave source is located in the space defined by the ridge reflector.

2. The assembly according to claim 1, wherein a refractive index of the ridge reflector is equal to or greater than 2.

3. The assembly according to claim 1, wherein the electromagnetic wave signal comprises at least one selected from a group consisting of a visible light, an infrared light, a terahertz radiation, and a microwave radiation.

4. The assembly according to claim 1, wherein the electromagnetic wave signal has a wavelength selected from a range of 400 nm to 3 µm.

5. The assembly according to claim 1, further comprising:
one or more nanostructures in the space.

6. The assembly according to claim 5, wherein the one or more nanostructures are nanoparticles.

7. The assembly according to claim 5, wherein each of the one or more nanostructures has a refractive index equal to or greater than 2.

8. The assembly according to claim 5, wherein the one or more nanostructures comprise a semiconductor material.

9. The assembly according to claim 5, wherein the one or more nanostructures comprise a dielectric material.

10. The assembly according to claim 5, wherein the one or more nanostructures are a plurality of nanostructures.

11. The assembly according to claim 5, wherein the antenna is further configured to direct the electromagnetic wave signal in a further direction opposite the direction; and wherein the further direction is also at least substantially perpendicular to the plane.

12. The assembly according to claim 5, wherein the ridge reflector has any one suitable shape selected from a group consisting of circle, a square, and a polygon.

13. The assembly according to claim 1, further comprising:
a substrate in contact with the antenna.

14. The assembly according to claim 1, further comprising:
a medium covering the antenna;
wherein the medium has a refractive index equal to or less than 2.

15. A method of forming an assembly, the method comprising:
providing an antenna comprising arranging a ridge reflector along a plane; and
providing at least one electromagnetic source;
wherein the ridge reflector is configured to enhance an emission of the at least one electromagnetic wave source providing an electromagnetic wave signal to the antenna and further configured to direct the electromagnetic wave signal in a direction at least substantially perpendicular to the plane;
wherein the ridge reflector defines a space along the plane for allowing the electromagnetic wave signal to be directed in the direction at least substantially perpendicular to the plane;
wherein the ridge reflector comprises at least one of a dielectric material and a semiconductor material;
wherein the ridge reflector is a continuous structure surrounding the space; and
wherein the at least one electromagnetic wave source is located in the space defined by the ridge reflector.

16. The method according to claim 15, further comprising:
providing one or more nanostructures in the space.

* * * * *